US012573920B2

(12) United States Patent
Takasaka et al.

(10) Patent No.: US 12,573,920 B2
(45) Date of Patent: Mar. 10, 2026

(54) YOKE MEMBER FOR TORQUE DETECTION DEVICE, TORQUE DETECTION DEVICE, AND STEERING DEVICE

(71) Applicant: DENSO CORPORATION, Kariya (JP)

(72) Inventors: Seiji Takasaka, Kariya (JP); Toshirou Suzuki, Kariya (JP); Ken Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 366 days.

(21) Appl. No.: 17/727,010

(22) Filed: Apr. 22, 2022

(65) Prior Publication Data

US 2022/0247277 A1    Aug. 4, 2022

Related U.S. Application Data

(63) Continuation of application No. PCT/JP2020/044315, filed on Nov. 27, 2020.

(30) Foreign Application Priority Data

Nov. 29, 2019    (JP) .................................. 2019-217023
Feb. 27, 2020    (JP) .................................. 2020-032101

(51) Int. Cl.
| | |
|---|---|
| *H02K 11/24* | (2016.01) |
| *B62D 5/04* | (2006.01) |
| *G01L 3/10* | (2006.01) |
| *G01L 5/22* | (2006.01) |

(52) U.S. Cl.
CPC .............. *H02K 11/24* (2016.01); *B62D 5/04* (2013.01); *G01L 3/104* (2013.01); *G01L 5/221* (2013.01)

(58) Field of Classification Search
None
See application file for complete search history.

(56) References Cited

U.S. PATENT DOCUMENTS

| | | | |
|---|---|---|---|
| 2002/0189371 A1 | 12/2002 | Nakane et al. | |
| 2003/0209087 A1 | 11/2003 | Nakane et al. | |
| 2004/0011138 A1* | 1/2004 | Gandel ................... | G01L 3/104 |
| | | | 73/847 |
| 2006/0137474 A1 | 6/2006 | Nakane et al. | |
| 2007/0295109 A1 | 12/2007 | Tokumoto et al. | |
| 2008/0073995 A1* | 3/2008 | Niguchi ................ | H02K 29/03 |
| | | | 180/444 |
| 2012/0285266 A1* | 11/2012 | Takahashi ............... | G01L 5/221 |
| | | | 73/862.331 |

(Continued)

FOREIGN PATENT DOCUMENTS

| | | | | |
|---|---|---|---|---|
| CN | 103154672 A | * | 6/2013 | ............. G01B 7/003 |

*Primary Examiner* — Stephen D Meier
*Assistant Examiner* — Ruben C Parco, Jr.
(74) *Attorney, Agent, or Firm* — Posz Law Group, PLC

(57) ABSTRACT

A yoke member includes a primary yoke and a secondary yoke which are opposed to each other. The primary yoke is configured such that a maximum width of a widest portion of each of a plurality of primary teeth of the primary yoke is smaller than a minimum width of a narrowest portion of a primary ring plate of the primary yoke. The secondary yoke is configured such that a maximum width of a widest portion of each of a plurality of secondary teeth of the secondary yoke is smaller than a minimum width of a narrowest portion of a secondary ring plate of the secondary yoke.

25 Claims, 16 Drawing Sheets

(56)          References Cited

U.S. PATENT DOCUMENTS

2018/0180497 A1*   6/2018   Nishiguchi  ............. G01L 3/104
2018/0340853 A1*  11/2018   Berner  .................... B62D 6/10
2020/0158795 A1    5/2020   Suzuki et al.

* cited by examiner 311a, 321a 311, 321

310, 320

312, 322

L2

L1

MAGNETIC FLUX DENSITY OF
PRIMARY AND SECONDARY RING PLATES [%]

YOKE MEMBER FOR TORQUE DETECTION DEVICE, TORQUE DETECTION DEVICE, AND STEERING DEVICE

CROSS REFERENCE TO RELATED APPLICATIONS

This application is a continuation application of International Patent Application No. PCT/JP2020/044315 filed on Nov. 27, 2020, which designated the U.S. and claims the benefit of priority from Japanese Patent Application No. 2019-217023 filed on Nov. 29, 2019 and Japanese Patent Application No. 2020-032101 filed on Feb. 27, 2020. The entire disclosures of all of the above applications are incorporated herein by reference.

TECHNICAL FIELD

The present disclosure relates to a yoke member for a torque detection device, the torque detection device, and a steering device.

BACKGROUND

Conventionally, there has been proposed a torque detection device that detects a change in a magnetic flux generated by relative rotation between a multipole magnet and a yoke member through a magnetic sensor and detects torque applied to a torsion bar based on a measurement signal of the magnetic sensor.

SUMMARY

This section provides a general summary of the disclosure, and is not a comprehensive disclosure of its full scope or all of its features.

According to one aspect of the present disclosure, there is provided a yoke member for a torque detection device. The yoke member includes a primary yoke and a secondary yoke which are opposed to each other. The primary yoke is configured such that a maximum width of a widest portion of each of a plurality of primary teeth of the primary yoke is smaller than a minimum width of a narrowest portion of a primary ring plate of the primary yoke. The secondary yoke is configured such that a maximum width of a widest portion of each of a plurality of secondary teeth of the secondary yoke is smaller than a minimum width of a narrowest portion of a secondary ring plate of the secondary yoke.

According to another aspect of the present disclosure, there is provided a yoke member for a torque detection device. The yoke member includes a primary yoke and a secondary yoke which are opposed to each other. The primary yoke has at least one reducing portion that is configured to reduce a magnetic flux that flows from a corresponding one of a plurality of primary teeth of the primary yoke to a primary ring plate of the primary yoke. The secondary yoke has at least one reducing portion that is configured to reduce a magnetic flux that flows from a corresponding one of a plurality of secondary teeth of the secondary yoke to a secondary ring plate of the secondary yoke.

According to another aspect of the present disclosure, there is provided a torque detection device that includes a multipole magnet, the yoke member described above and a magnetic detection element. The magnetic detection element is configured to output a measurement signal, which corresponds to a magnetic flux generated between the primary yoke and the secondary yoke.

According to another aspect of the present disclosure, there is provided a steering device for a vehicle, including the torque detection device described above and an electric motor. The electric motor is configured to output a drive force for assisting operation of a steering unit, which is configured to be operated by an occupant of the vehicle, based on the measurement signal of the torque detection device.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
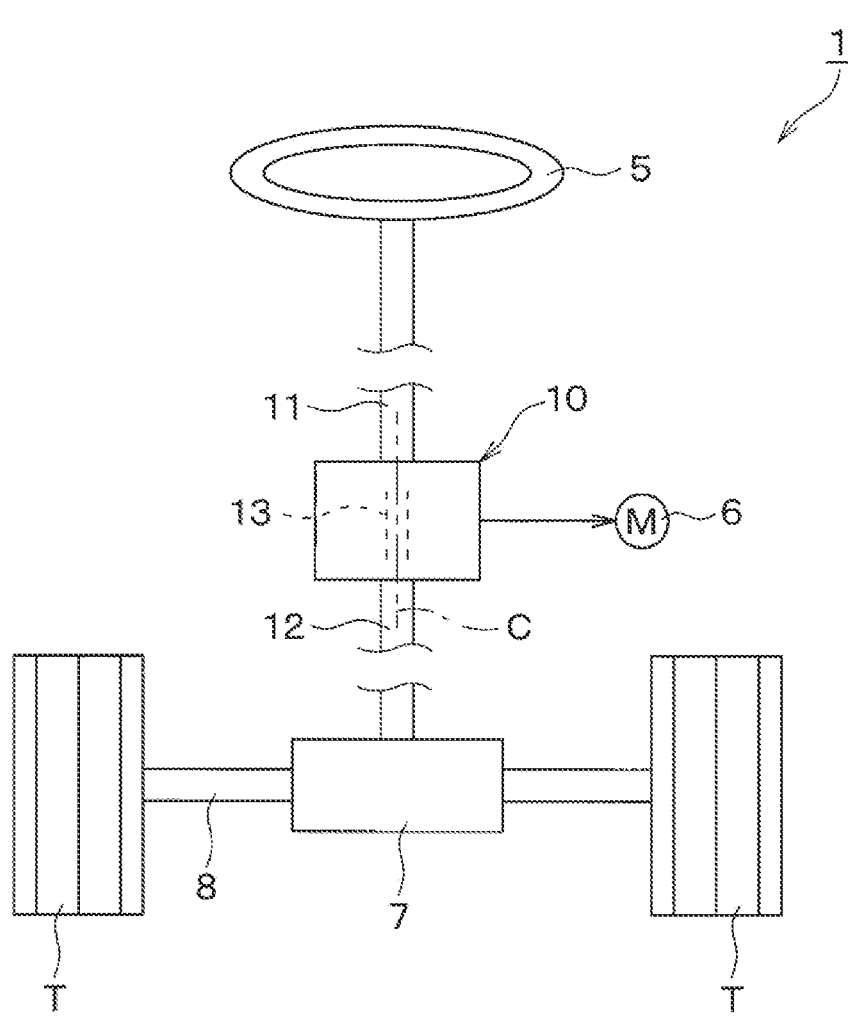
FIG. 1 is a schematic structural diagram of an electric power steering device that has a torque detection device of a first embodiment.

Conventionally, there has been proposed a torque detection device that detects a change in a magnetic flux generated by relative rotation between a multipole magnet and a yoke member through a magnetic sensor and detects torque applied to a torsion bar based on a measurement signal of the magnetic sensor.

Specifically, the multipole magnet is shaped in a cylindrical tubular form, and N-poles and S-poles are alternately arranged in a circumferential direction of the multipole magnet. The yoke member includes a pair of yokes, and each of the yokes has a ring plate and a plurality of teeth while the teeth are arranged along an inner periphery of the ring plate. The yoke member is constructed as follows. That is, the yokes are opposed to each other such that the teeth of one of the yokes and the teeth of the other one of the yokes are alternately arranged. Furthermore, the multipole magnet and the yoke member are arranged such that a central axis of the multipole magnet and a central axis of the yoke member (i.e., a central axis of the ring plates) coincide with each other.

However, at the time of forming the torque detection device, the central axis of the multipole magnet and the central axis of the yoke member may deviate from each other due to manufacturing errors during assembly. In this case, magnetic poles are generated in each of yokes due to occurrence of a flow of a magnetic flux. Therefore, if the central axis of the multipole magnet and the central axis of the yoke member deviate from each other, the detection accuracy of the torque may possibly be deteriorated.

According to one aspect of the present disclosure, there is provided a yoke member for a torque detection device. The yoke member includes a primary yoke and a secondary yoke which are opposed to each other. The primary yoke has: a primary ring plate, which is shaped in a ring form; and a plurality of primary teeth, which are arranged at equal intervals along an inner periphery of the primary ring plate and project in a normal direction that is normal to a plane of the primary ring plate. The secondary yoke has: a secondary ring plate, which is shaped in a ring form; and a plurality of secondary teeth, which are arranged at equal intervals along an inner periphery of the secondary ring plate and project in a normal direction that is normal to a plane of the secondary ring plate. The primary yoke and the secondary yoke are configured such that the plurality of primary teeth and the plurality of secondary teeth are alternately arranged in a circumferential direction of the primary ring plate, and a predetermined gap is maintained between the primary yoke and the secondary yoke. The primary yoke is configured such that a maximum width of a widest portion of each of the plurality of primary teeth, which is widest along each of the plurality of primary teeth in an alignment direction of the primary yoke and the secondary yoke, is smaller than a minimum width of a narrowest portion of the primary ring plate between the inner periphery and an outer periphery of the primary ring plate while the alignment direction of the primary yoke and the secondary yoke is a direction along which the primary yoke and the secondary yoke are arranged. The secondary yoke is configured such that a maximum width of a widest portion of each of the plurality of secondary teeth, which is widest along each of the plurality of secondary teeth in the alignment direction, is smaller than a minimum width of a narrowest portion of the secondary ring plate between the inner periphery and an outer periphery of the secondary ring plate.

Accordingly, the primary and secondary yokes are configured such that the maximum width of each of the primary and secondary teeth is smaller than the minimum width of the corresponding one of the primary and secondary ring plates. Therefore, in the torque detection device, which includes the multipole magnet and the yoke member for the torque detection device, even when the central axis of the multipole magnet and the central axis of the yoke member deviate from each other, the amount of the magnetic flux, which is guided from the multipole magnet to each of the primary and secondary teeth, can be reduced, and thereby the amount of the magnetic flux, which is guided from each of the primary and secondary teeth to a corresponding one of the primary and secondary ring plates, can be reduced. As a result, the strength of the magnetic poles, which are generated at the primary and secondary ring plates, can be reduced, and thereby it is possible to limit a deterioration in the detection accuracy.

According to another aspect of the present disclosure, there is provided a yoke member for a torque detection device. The yoke member includes a primary yoke and a secondary yoke which are opposed to each other. The primary yoke has: a primary ring plate, which is shaped in a ring form; and a plurality of primary teeth, which are arranged at equal intervals along an inner periphery of the primary ring plate and project in a normal direction that is normal to a plane of the primary ring plate. The secondary yoke has: a secondary ring plate, which is shaped in a ring form; and a plurality of secondary teeth, which are arranged at equal intervals along an inner periphery of the secondary ring plate and project in a normal direction that is normal to a plane of the secondary ring plate. The primary yoke and the secondary yoke are arranged such that the plurality of primary teeth and the plurality of secondary teeth are alternately arranged in a circumferential direction of the primary ring plate, and a predetermined gap is maintained between the primary yoke and the secondary yoke. The primary yoke has at least one reducing portion that is configured to reduce a magnetic flux that flows from a corresponding one of the plurality of primary teeth to the primary ring plate. The secondary yoke has at least one reducing portion that is configured to reduce a magnetic flux that flows from a corresponding one of the plurality of secondary teeth to the secondary ring plate.

Accordingly, each of the primary and secondary yokes has the at least one reducing portion that reduces the magnetic flux density of the magnetic flux which flows from the corresponding one of the primary and secondary teeth to the corresponding one of the primary and secondary ring plates. Therefore, in the torque detection device, which includes the multipole magnet and the yoke member for the torque detection device, even when the central axis of the multipole magnet and the central axis of the yoke member deviate from each other, the amount of the magnetic flux, which is guided from the primary and secondary teeth to the primary and secondary ring plates, can be reduced. As a result, the strength of the magnetic poles, which are generated at the primary and secondary ring plates, can be reduced, and thereby it is possible to limit a deterioration in the detection accuracy.

According to another aspect of the present disclosure, there is provided a torque detection device configured to output a measurement signal that corresponds to a torsional torque generated at a torsion bar in response to relative rotation between a first shaft and a second shaft about a rotational axis while the torsion bar coaxially couples between the first shaft and the second shaft along the rotational axis. The torque detection device includes: a multipole magnet that is coaxial with the torsion bar and has a plurality of magnetic poles arranged in a circumferential direction about the rotational axis such that polarities of the plurality of magnetic poles are alternately changed in the circumferential direction, wherein the multipole magnet is configured to rotate about the rotational axis in response to the relative rotation; the above-described yoke member, which surrounds the multipole magnet and is arranged such that a central axis of the yoke member coincides with the rotational axis; a magnetic detection element that is config- ured to output the measurement signal, which corresponds to a magnetic flux generated between the primary yoke and the secondary yoke; and a magnetic flux guide member that is configured to guide the magnetic flux, which is generated between the primary yoke and the secondary yoke, to the magnetic detection element.

As described above, when the above-described yoke member is applied to the torque detection device, which includes the magnetic detection element and the magnetic flux guide member, it is possible to effectively limit the reduction in the detection accuracy.

According to another aspect of the present disclosure, there is provided a steering device for a vehicle. The steering device includes the above-described torque detection device; and an electric motor that is configured to output a drive force for assisting operation of a steering unit, which is configured to be operated by an occupant of the vehicle, based on the measurement signal of the torque detection device.

When the above-described torque detection device is applied to the steering device, which includes the steering unit and the electric motor, it is possible to effectively limit the reduction in the detection accuracy.

Hereinafter, embodiments of the present disclosure will be described with reference to the drawings. In the following embodiments, portions, which are identical to each other or equivalent to each other, will be indicated by the same reference signs.

First Embodiment

A first embodiment will be described with reference to the drawings. In this embodiment, there will be described an example in which a torque detection device is constructed by using a yoke member for the torque detection device, and an electric power steering device is constructed by using the torque detection device. In this embodiment, a column-type electric power steering device installed at a motor vehicle will be described.

As shown in FIG. 1, the electric power steering device 1 includes a steering wheel 5, an electric motor 6, a steering gear mechanism 7, a link mechanism 8 and a torque detection device 10. The electric power steering device 1 drives the electric motor 6 according to an operational state of the steering wheel 5 operated by an occupant of the vehicle and transmits a drive force of the electric motor 6 to the steering gear mechanism 7. As a result, the electric power steering device 1 assists a steering force for changing the orientation of wheels T through the link mechanism 8. In the present embodiment, the steering wheel 5 corresponds to a steering unit.

The torque detection device 10 is installed between the steering wheel 5 and the steering gear mechanism 7 such that the torque detection device 10 outputs a measurement signal (e.g., a voltage) according to the operational state of the steering wheel 5. Specifically, the torque detection device 10 is placed at a connection between a first shaft 11 and a second shaft 12. The first shaft 11 is connected to the steering wheel 5 through a coupling mechanism (not shown) such that the first shaft 11 is rotated together with the steering wheel 5. The second shaft 12 is coupled to steering gear mechanism 7 through a coupling mechanism (not shown).

Figure 2:
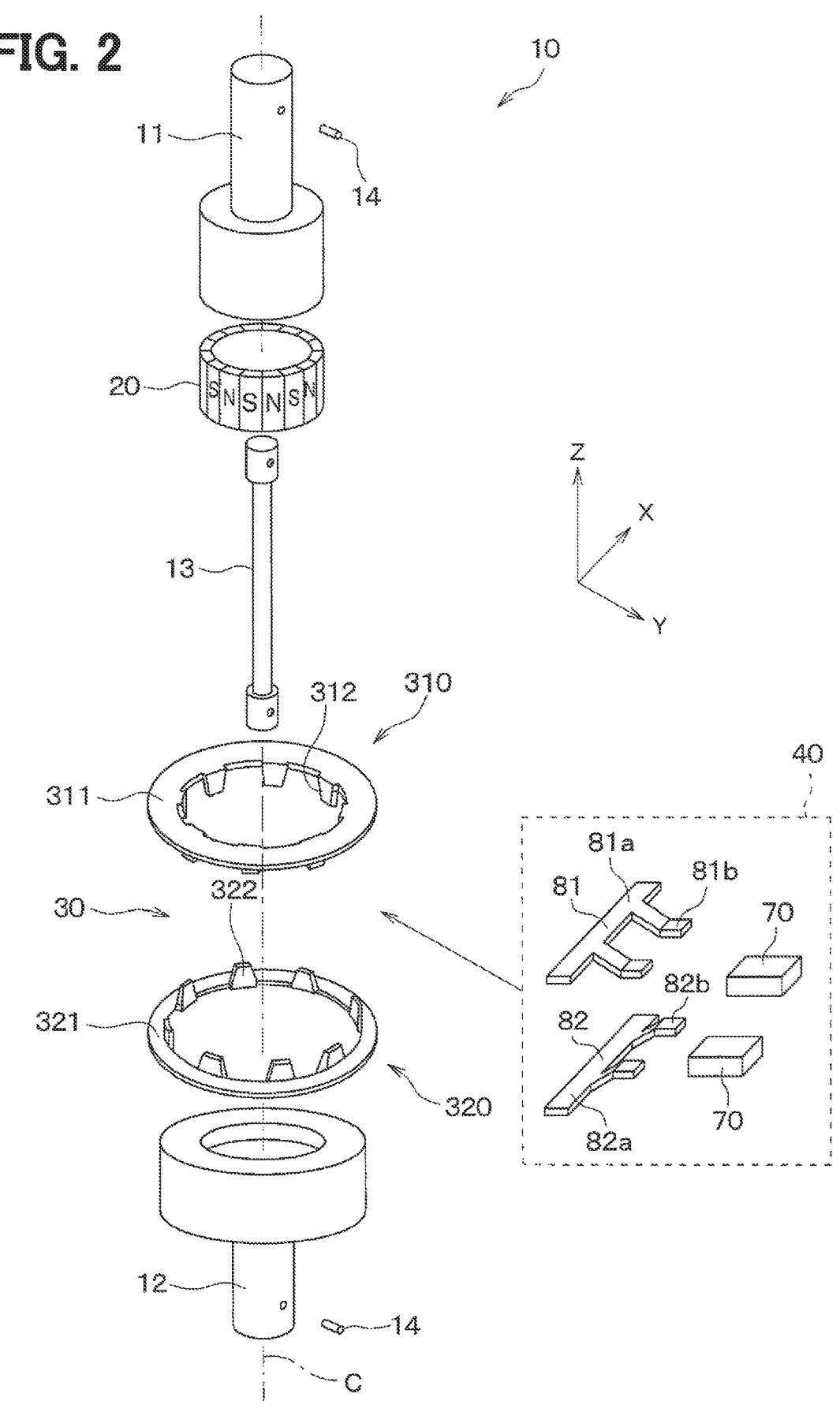
FIG. 2 is an exploded perspective view of the torque detection device shown in FIG. 1.

The first shaft 11 and the second shaft 12 are coaxially coupled with each other along a rotational axis C through a torsion bar 13. The torque detection device 10 is configured to output the measurement signal, which corresponds to a torsional torque generated at the torsion bar 13 in response to relative rotation between the first shaft 11 and the second shaft 12 about the rotational axis C. The torsion bar 13 is fixed to the first shaft 11 and the second shaft 12 by fixing pins 14 as shown in FIG. 2 which will be described later.

Next, a basic structure of the torque detection device 10 of the present embodiment will be described with reference to FIG. 2. For convenience of explanation, in each of the following figures, there is set a right-handed XYZ Cartesian coordinate system in which the Z axis is parallel to the rotational axis C. A direction, which is parallel to the Z axis, will be also referred to as an axial direction. In many cases, the rotational axis C is not parallel to a vehicle height direction (i.e., a top-to-bottom direction of the vehicle).

The torque detection device 10 includes a multipole magnet 20. The multipole magnet 20 is placed to be coaxial with the torsion bar 13 such that the multipole magnet 20 is rotated about the rotational axis C in response to the relative rotation between the first shaft 11 and the second shaft 12. Specifically, the multipole magnet 20 is shaped in a cylin- drical tubular form and is fixed to a lower end portion of the first shaft 11. The multipole magnet 20 has a plurality of magnetic poles arranged in a circumferential direction about the rotational axis C such that polarities of the magnetic poles are alternately changed in the circumferential direc- tion.

The circumferential direction is typically a circumferen- tial direction of a circle that is formed in an X-Y plane about an intersection between the rotational axis C and the X-Y plane. Further, in the present embodiment, the multipole magnet 20 has a total of sixteen magnetic poles, which include eight N-poles and eight S-poles, and these magnetic poles are arranged at 22.5 degree intervals.

Figure 3:
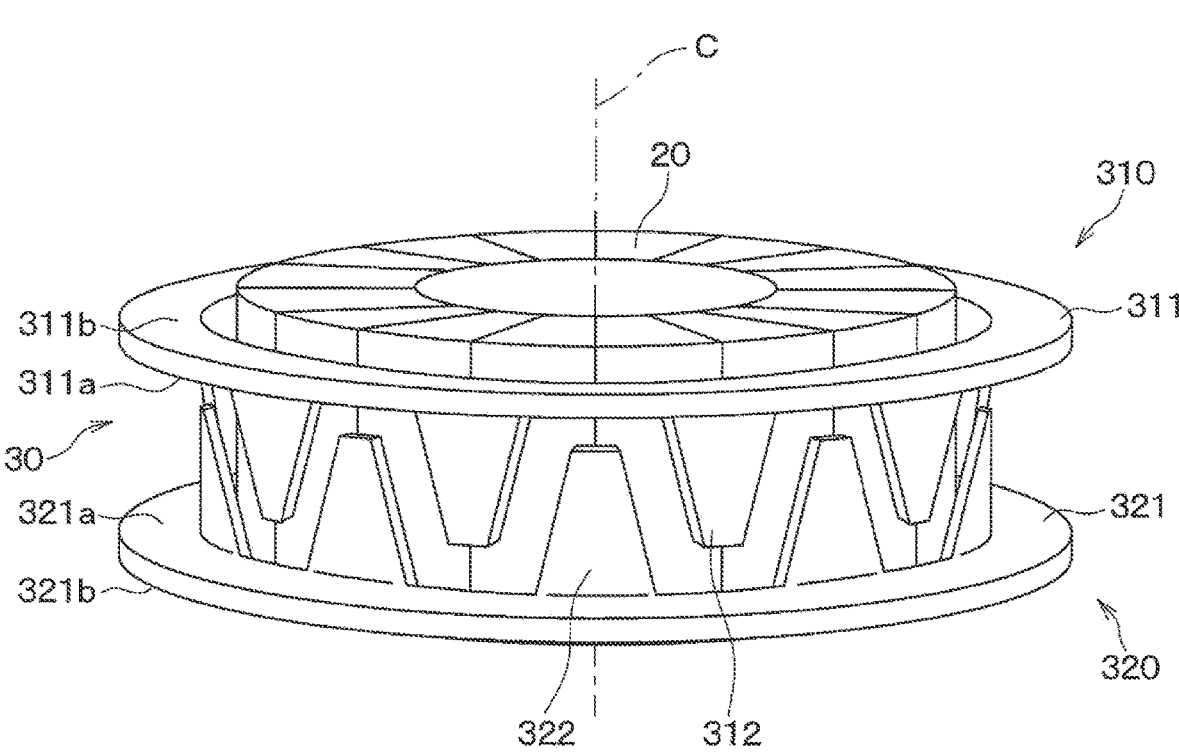
FIG. 3 is an enlarged perspective view showing a multipole magnet and a yoke member in an assembled state of the torque detection device shown in FIG. 2.
Figure 4A:
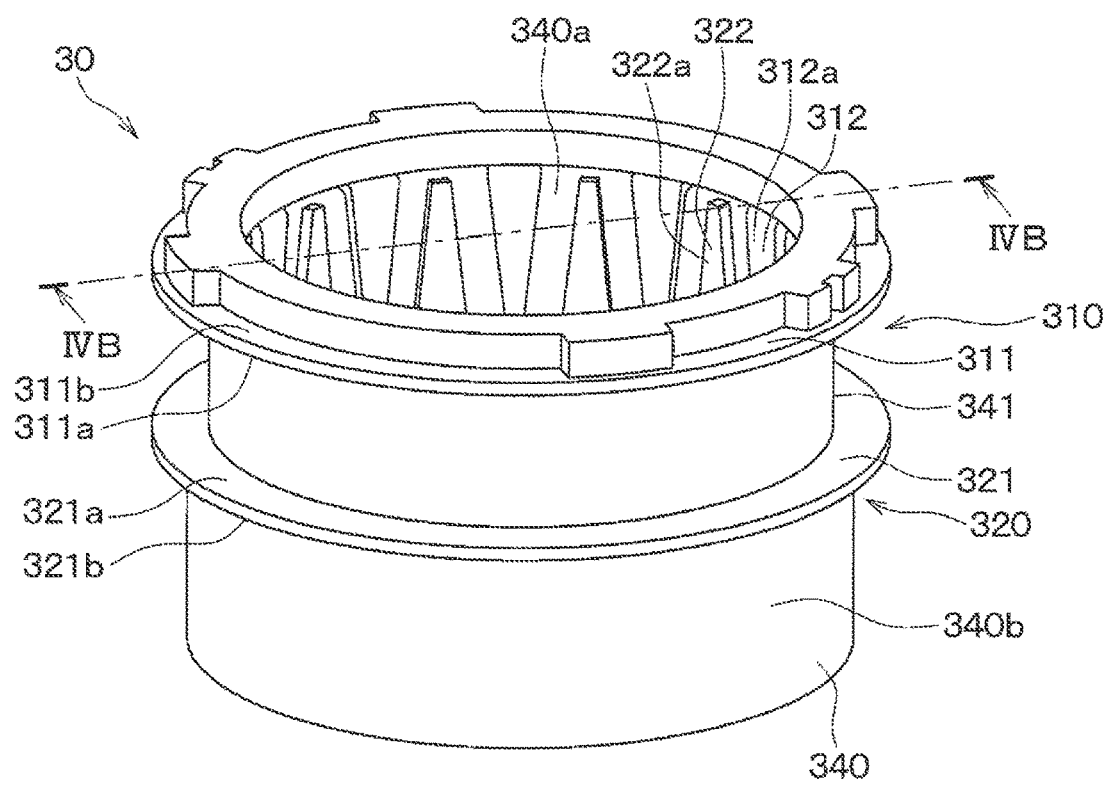
FIG. 4A is a perspective view of the yoke member.
Figure 4B:
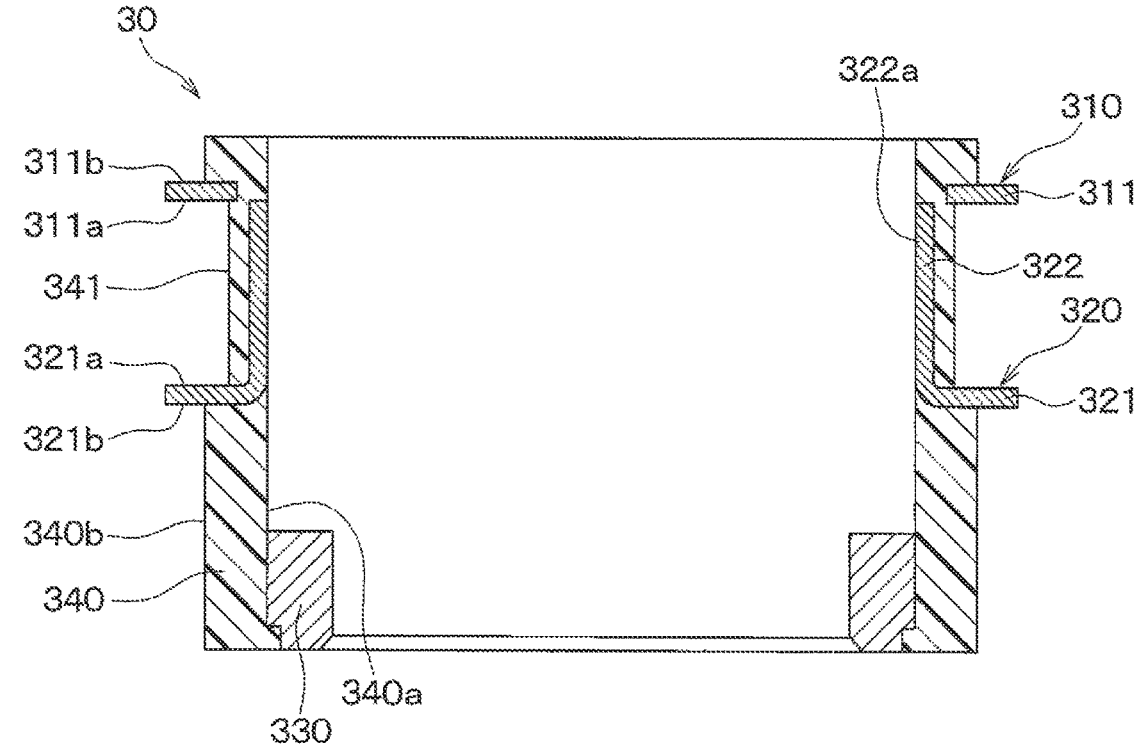
FIG. 4B is a cross-sectional view of the yoke member taken along line IVB-IVB in FIG. 4A.
Figure 4C:
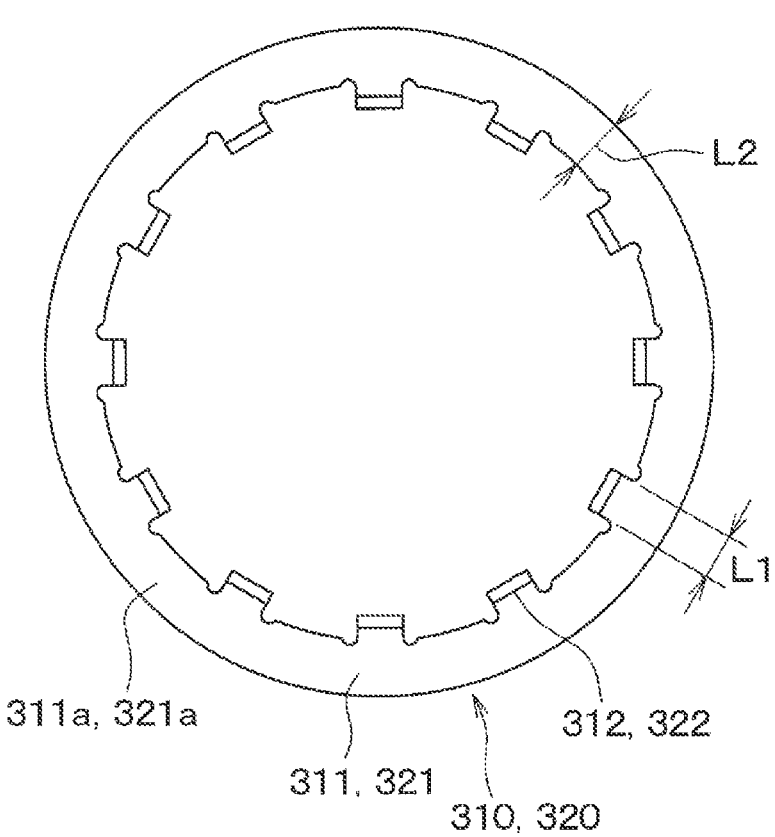
FIG. 4C is a plan view of primary and secondary yokes.

As shown in FIGS. 2 and 3, a yoke member 30, which is shaped generally in a cylindrical tubular form, is located on a radially outer side of the multipole magnet 20, and the yoke member 30 includes a primary yoke 310 and a sec- ondary yoke 320 which are opposed to the multipole magnet 20. Hereinafter, a structure of the yoke member 30 of the present embodiment will be described in detail with refer- ence to FIGS. 2, 3 and 4A to 4C. In FIGS. 2 and 3, indication of a holder member 340 of the yoke member 30 described later is omitted for the sake of simplicity. Furthermore, FIG. 4C is a plan view seen from one surface 311*a* side of a primary ring plate 311 of the primary yoke 310 and one surface 321*a* side of a secondary ring plate 321 of the secondary yoke 320.

The yoke member 30 includes the primary yoke 310, the secondary yoke 320, a fixing collar 330 and the holder member 340 while the holder member 340 integrally holds the primary yoke 310, the secondary yoke 320 and the fixing collar 330.

The primary yoke 310 is made of a soft magnetic material and has the primary ring plate 311 and a plurality of primary teeth 312. Specifically, the primary ring plate 311 is shaped in a planar ring plate form and has the one surface 311*a* and the other surface 311*b*. Specifically, an opening, which is shaped in a circular form, is formed at a center of the primary ring plate 311. The primary teeth 312 are formed along the inner periphery of the primary ring plate 311 such that the primary teeth 312 project on the one surface 311*a* side of the primary ring plate 311 and are arranged at equal intervals in the circumferential direction along the inner periphery of the primary ring plate 311. In the present embodiment, the inner periphery and the outer periphery of the primary ring plate 311 are respectively shaped generally in a circular form. Furthermore, hereinafter, a surface of each of the primary teeth 312, which is located on a side where the opening of the primary ring plate 311 is placed, will be also referred to as an inner surface 312*a* of the primary tooth 312. Furthermore, in the present embodiment, each of the primary teeth 312 is shaped in a tapered form such that a width of the primary tooth 312 is progressively reduced from a base to a distal end of the primary tooth 312.

Similarly, the secondary yoke 320 is made of a soft magnetic material and has the secondary ring plate 321 and a plurality of secondary teeth 322. Specifically, the secondary ring plate 321 is shaped in a planar ring plate form and has the one surface 321*a* and the other surface 321*b*. An opening, which is shaped in a circular form, is formed at a center of the secondary ring plate 321. The secondary teeth 322 are formed along an inner periphery of the secondary ring plate 321 such that the secondary teeth 322 project on the one surface 321*a* side of the secondary ring plate 321 and are arranged at equal intervals in the circumferential direction along the inner periphery of the secondary ring plate 321. In the present embodiment, the inner periphery and the outer periphery of the secondary ring plate 321 are respectively shaped generally in a circular form. Furthermore, hereinafter, a surface of each of the secondary teeth 322, which is located on a side where the opening of the secondary ring plate 321 is placed, will be also referred to as an inner surface 322*a* of the secondary tooth 322. Furthermore, in the present embodiment, each of the secondary teeth 322 is shaped in a tapered form such that a width of the secondary tooth 322 is progressively reduced from a base to a distal end of the secondary tooth 322.

The primary yoke 310 and the secondary yoke 320 are arranged such that the one surface 311*a* and the one surface 321*a* are opposed to each other. Specifically, the primary yoke 310 and the secondary yoke 320 are arranged such that the primary teeth 312 and the secondary teeth 322 are alternately arranged in the circumferential direction while a predetermined gap is interposed between each of the primary teeth 312 and an adjacent one of the secondary teeth 322 in the circumferential direction. That is, the primary yoke 310 and the secondary yoke 320 are arranged such that the primary ring plate 311 and the secondary ring plate 321 are opposed to each other in the axial direction. In other words, the primary ring plate 311 and the secondary ring plate 321 overlap with each other when the primary ring plate 311 and the secondary ring plate 321 are viewed in the axial direction.

In the present embodiment, as shown in FIG. 4C, the primary yoke 310 is formed such that in a normal direction (hereinafter, also simply referred to as a normal direction), which is normal to the one surface 311*a*, a maximum width L1 of each of the primary teeth 312 is smaller than a minimum width L2 of the primary ring plate 311. Similarly, the secondary yoke 320 is formed such that in a normal direction (hereinafter, also simply referred to as a normal direction), which is normal to the one surface 321*a*, a maximum width L1 of each of the secondary teeth 322 is smaller than a minimum width L2 of the secondary ring plate 321.

Since each of the primary and secondary teeth 312, 322 is shaped in the tapered form in the present embodiment, the maximum width L1 of each of the primary and secondary teeth 312, 322 is a width of the base of each of the primary and secondary teeth 312, 322. In other words, the maximum width L1 of each of the primary and secondary teeth 312, 322 is a width of a connection of each of the primary and secondary teeth 312, 322 which is joined to the corresponding one of the primary and secondary ring plates 311, 321. The minimum width L2 of each of the primary and secondary ring plates 311, 321 is a radial length of a narrowest portion which is located between the inner periphery and the outer periphery in the ring plate 311, 321 while a difference between an inner diameter and an outer diameter is smallest at the narrowest portion in the ring plate 311, 321. In the present embodiment, the inner periphery and the outer periphery of each of the primary and secondary ring plates 311, 321 is shaped generally in the circular form. Therefore, the minimum width L2 of each of the primary and secondary ring plates 311, 321 is, for example, a width of a portion of the ring plate 311, 321 which is circumferentially centered between adjacent two of the primary and secondary teeth 312, 322 at the ring plate 311, 321.

As described later, the fixing collar 330 is a ring-shaped member fixed to the second shaft 12 and is located on a side of the secondary yoke 320 which is opposite from the primary yoke 310.

The holder member 340 is a member that integrally holds the primary yoke 310, the secondary yoke 320 and the fixing collar 330 and is made of, for example, thermoplastic resin. Specifically, the holder member 340 is shaped generally in a cylindrical tubular form and has an inner peripheral surface 340*a* and an outer peripheral surface 340*b*, and the inner surfaces 312*a* of the primary teeth 312 and the inner surfaces 322*a* of the secondary teeth 322 are exposed from the inner peripheral surface 340*a*. Furthermore, the holder member 340 has a groove 341 at the outer peripheral surface 340*b* of the holder member 340, and the one surface 311*a* of the primary ring plate 311 and the one surface 321*a* of the secondary ring plate 321 are exposed at the groove 341. Specifically, in the holder member 340, the groove 341 is formed at a portion of the outer peripheral surface 340*b* which is located between the primary ring plate 311 and the secondary ring plate 321.

The structure of the yoke member 30 of the present embodiment is described above. The yoke member 30 is placed in position by fixing the fixing collar 330 to a connecting portion (not shown) formed at an upper end portion of the second shaft 12 such that the primary yoke 310 and the secondary yoke 320 are opposed to the multi-pole magnet 20 in a radial direction. Specifically, the yoke member 30 is placed such that the central axis of the multipole magnet 20 and the central axis of the yoke member 30 coincide with each other. Furthermore, the yoke member 30 is arranged such that the primary yoke 310 surrounds one end portion (i.e., an upper end portion) of the multipole magnet 20 located at one axial side, and the secondary yoke 320 surrounds the other end portion (i.e., a lower end portion) of the multipole magnet 20 located on the other axial side. Therefore, each of the primary yoke 310 and the secondary yoke 320 forms the opening shaped in the circular form centered at the rotational axis C and has the primary teeth 312 or the secondary teeth 322 along the rotational axis C. The central axis of the yoke member 30 can be said to be an axis that extends through the center of the primary and secondary ring plates 311, 321.

When the yoke member 30 is rotated together with the second shaft 12, the yoke member 30 is rotated relative to the multipole magnet 20. Therefore, the primary yoke 310 and the secondary yoke 320 form a magnetic circuit in a magnetic field generated by the multipole magnet 20. In the present embodiment, the axial direction corresponds to an alignment direction of the primary yoke 310 and the secondary yoke 320 along which the primary yoke 310 and the secondary yoke 320 are arranged.

Figure 5A:
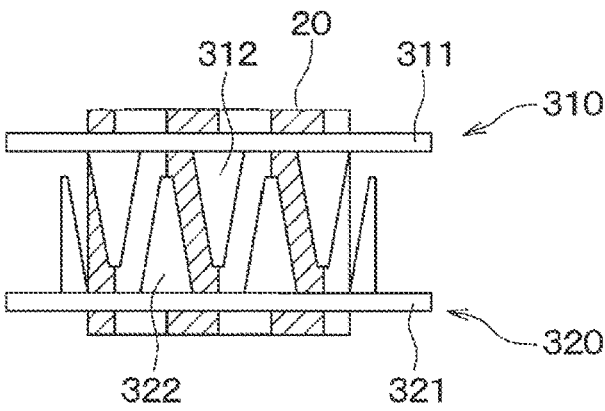
FIG. 5A is a side view showing a state of relative rotation between the multipole magnet and the primary and secondary yokes shown in FIG. 3.

Here, in an assembled state, in which the torsional torque is not applied to the torsion bar 13, the multipole magnet 20, the primary yoke 310 and the secondary yoke 320 are phased to a neutral state in the circumferential direction, as shown in FIGS. 3 and 5A. The neutral state is a state, in which a circumferential center of each of the primary and secondary teeth 312, 322 coincides with a boundary between the adjacent N-pole and the adjacent S-pole which are adjacent to the circumferential center of the tooth 312, 322. In this state, the central axis of the multipole magnet 20 and the central axis of the yoke member 30 coincide with each other.

Figure 5B:
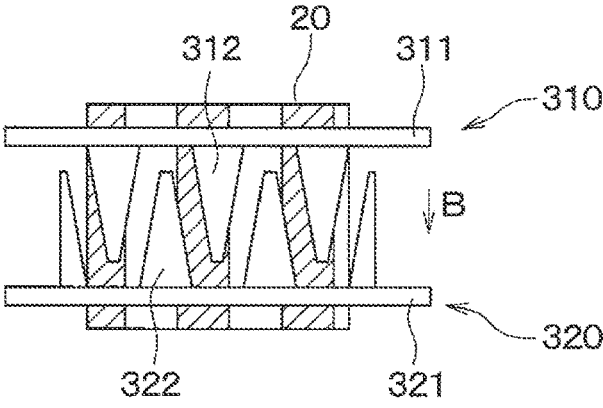
FIG. 5B is a side view showing another state of the relative rotation between the multipole magnet and the primary and secondary yokes shown in FIG. 3.
Figure 5C:
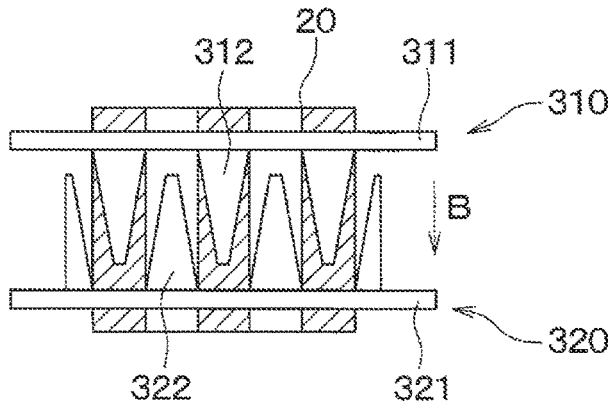
FIG. 5C is a side view showing a further state of the relative rotation between the multipole magnet and the primary and secondary yokes shown in FIG. 3.

Then, when the torsional torque is generated at the torsion bar 13 in response to the relative rotation between the first shaft 11 and the second shaft 12, the primary yoke 310 and the secondary yoke 320 shift from the neutral state, as shown in FIGS. 5B and 5C. Therefore, the primary yoke 310 and the secondary yoke 320 generate a magnetic flux density B which corresponds to the amount of phase shift of the primary yoke 310 and the secondary yoke 320.

Furthermore, as shown in FIG. 2, in the torque detection device 10, a magnetic sensor 40, which includes a plurality of magnetic detection elements 70, a primary magnetic flux guide member 81 and a secondary magnetic flux guide member 82, is arranged such that the magnetic sensor 40 is placed adjacent to the primary yoke 310 and the secondary yoke 320. The magnetic sensor 40 is configured to output the measurement signal, which corresponds to the magnetic flux generated at the primary and secondary yokes 310, 320, i.e., the measurement signal, which corresponds to the torsional torque generated at the torsion bar 13. Hereinafter, the structure of the magnetic sensor 40 of the present embodiment will be described with reference to FIGS. 6 and 7. The right-handed XYZ Cartesian coordinate system of FIGS. 6 and 7 corresponds to the right-handed XYZ Cartesian coordinate system of FIG. 2. Furthermore, in FIG. 6, the indication of a cover material 90 described later is omitted for the sake of simplicity.

Figure 6:
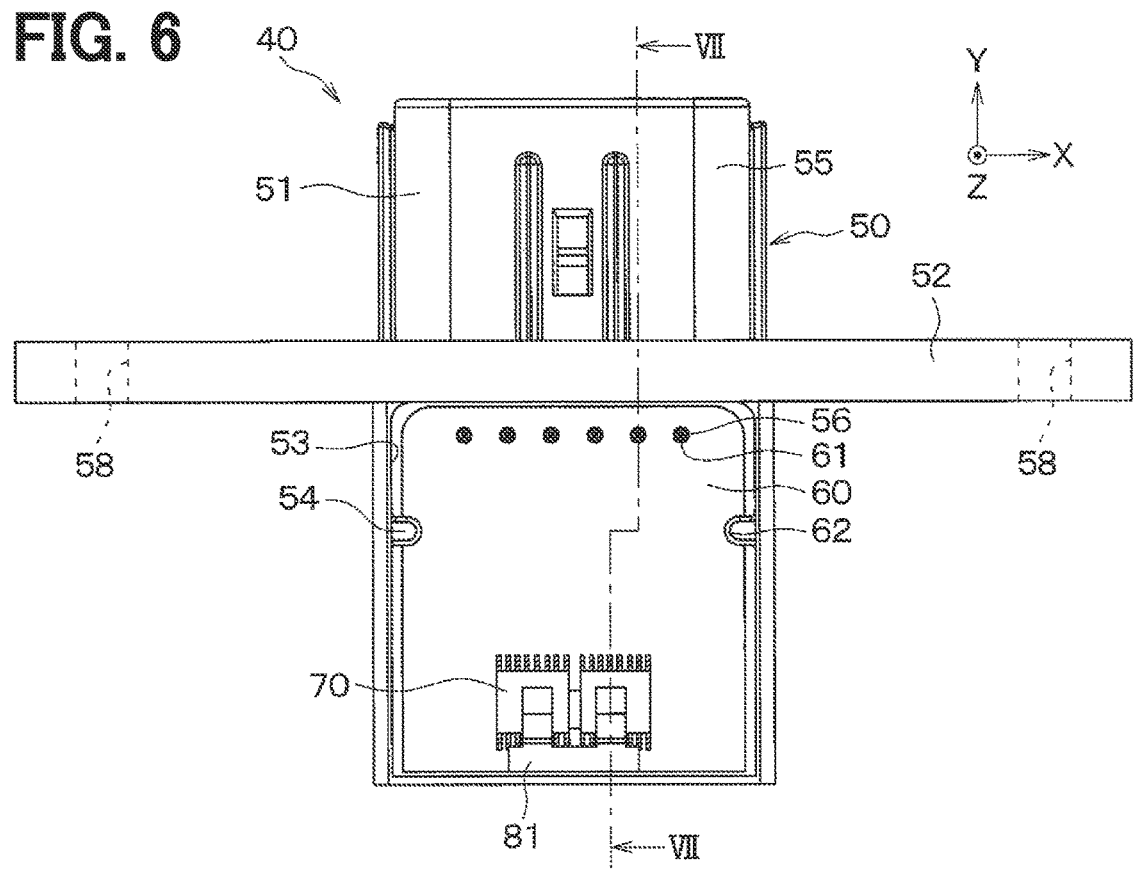
FIG. 6 is a front view of a magnetic sensor.
Figure 7:
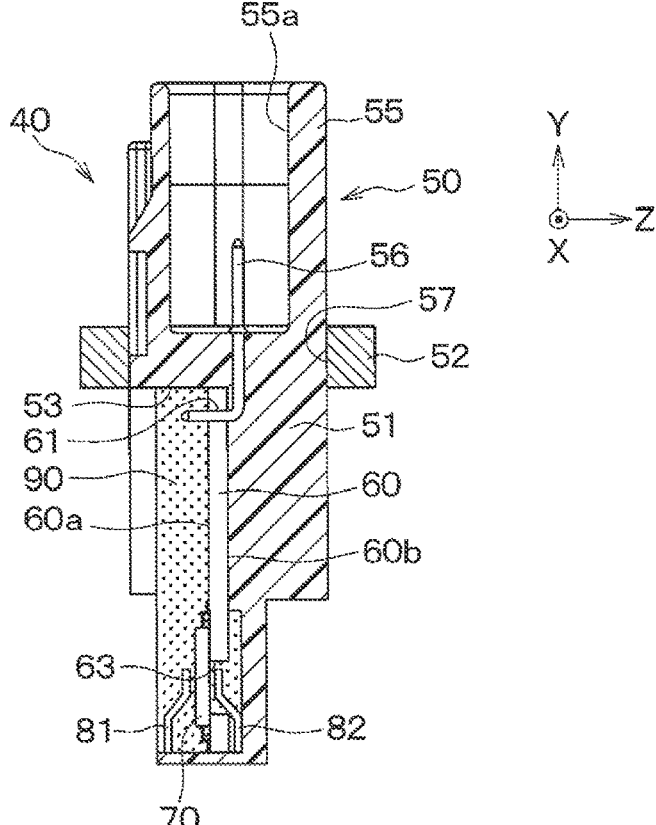
FIG. 7 is a cross-sectional view taken along line VII-VII in FIG. 6.

As shown in FIGS. 6 and 7, the magnetic sensor 40 of the present embodiment includes a sensor housing 50, a circuit board 60, the magnetic detection elements 70 and the primary and secondary magnetic flux guide members 81, 82.

The sensor housing 50 has a main portion 51 and a flange 52 while the main portion 51 is shaped in a columnar form and extends in the axial direction of the Y axis. Hereinafter, a lower side of the sensor housing 50 and the main portion 51 in of FIG. 6 will be also referred to as one end portion side, and an upper side of the sensor housing 50 and the main portion 51 in of FIG. 6 will be also referred to as the other end portion side. Furthermore, in FIG. 8 described later, an end portion (or an end portion side) of the sensor housing 50 and the main portion 51, which is located on the primary and secondary yoke 310, 320 side, is also referred to as the one end portion (or the one end portion side), and an opposite end portion (or the opposite end portion side) of the sensor housing 50 and the main portion 51, which is opposite to the one end portion, is also referred to as the other end portion (or the other end portion side).

In the present embodiment, the main portion 51 is formed by molding dielectric synthetic resin. A receiving recess 53 is formed at the one end portion side of the main portion 51. The receiving recess 53 is configured to receive the circuit board 60 and is shaped in a form that corresponds to an outer shape of the circuit board 60. In the present embodiment, as described later, since the circuit board 60 is shaped in a planar rectangular form, the receiving recess 53 is also shaped in a planar rectangular form. The receiving recess 53 has two projections 54 at two opposite side surfaces, respectively.

The other end portion side of the main portion 51 is formed as a connector 55 which is electrically connected to an external device, and the connector 55 has an opening 55a. The external device is, for example, an electronic control unit (ECU).

Furthermore, a plurality of terminals 56 are integrated in the main portion 51 by insert molding. Specifically, the terminals 56 are provided to the main portion 51 such that one end portions of the terminals 56 are exposed from the receiving recess 53, and the other end portions of the terminals 56 are exposed from the opening 55a. The one end portions of the terminals 56, which are exposed at the receiving recess 53, are inserted through insertion holes 61 of the circuit board 60 and are electrically and mechanically connected to the circuit board 60. The other end portions of the terminals 56, which are exposed from the opening 55a, are electrically connected to the external device.

The flange 52 is made of a metal material which has rigidity higher than that of the main portion 51, and a through-hole 57 is formed generally at a center of the flange 52. Iron, an iron-based alloy, aluminum or an aluminum-based alloy may be used as the metal material of the flange 52. The flange 52 is installed to the main portion 51 such that the main portion 51 is inserted through the through-hole 57. In the present embodiment, the flange 52 is located on the other end portion side of the receiving recess 53 at the main portion 51. The flange 52 may be integrated with the main portion 51 by insert molding. Alternatively, the flange 52 may be fixed to the main portion 51 by, for example, a bonding agent after insertion of the main portion 51 through the through-hole 57.

Furthermore, fixing holes 58 extend in the axial direction of the Y axis through an outer periphery of the flange 52.

The circuit board 60 is shaped in a planar rectangular form and has one surface 60a and the other surface 60b. The circuit board 60 also has the insertion holes 61 through which the one end portions of the terminals 56 are inserted. Furthermore, the circuit board 60 has two recesses 62, which respectively correspond to the projections 54 of the receiving recess 53. Also, the circuit board 60 has an opening 63, into which extensions 82b of the secondary magnetic flux guide member 82, which will be described later, are inserted.

The magnetic detection elements 70 are configured to output the measurement signal, which corresponds to the magnetic flux of the magnetic circuit formed by the primary yoke 310 and the secondary yoke 320. In the present embodiment, the number of the magnetic detection elements 70 is two, and these two magnetic detection elements 70 are arranged in the axial direction of the X axis at the one surface 60*a* of the circuit board 60. In the present embodiment, by providing the two magnetic detection elements 70 in this way, even if one of the magnetic detection elements 70 becomes unusable due to a failure or the like, the detection of the magnetic field can be continued with the other one of the magnetic detection elements 70.

Each of the magnetic detection elements 70 is formed by encapsulating a magnetic sensor element, such as a Hall element, at an inside of the magnetic detection element 70. Furthermore, each of the magnetic detection elements 70 includes a main body and a plurality of terminals. The main body is shaped generally in a planar rectangular form, and the terminals are provided to the main body. Each of the magnetic detection elements 70 is installed to the circuit board 60 such that the main body of the magnetic detection element 70 overlaps the opening 63 when the magnetic detection element 70 is viewed in a normal direction that is normal to a plane of the circuit board 60.

The circuit board 60, to which the magnetic detection elements 70 are installed, is placed in the receiving recess 53 of the main portion 51. Specifically, the circuit board 60 is placed such that the other surface 60*b* is opposed to a bottom surface of the receiving recess 53, and the opening 63 is placed at the one end portion side of the sensor housing 50. The circuit board 60 is installed to the receiving recess 53 such that the recesses 62 are respectively fitted with the projections 54 of the receiving recess 53, and the terminals 56 are inserted through the insertion holes 61. The circuit board 60 is electrically and mechanically connected to the terminals 56 by, for example, soldering and is thereby fixed to the receiving recess 53. The mechanical connection strength between the circuit board 60 and the sensor housing 50 may be improved by, for example, heating and plastically deforming the projections 54 against the circuit board 60 to hold the circuit board 60 with the plastically deformed projections 54.

The primary magnetic flux guide member 81 and the secondary magnetic flux guide member 82 are made of a soft magnetic material. In the present embodiment, as shown in FIG. 2, the primary magnetic flux guide member 81 includes a main body 81*a* and extensions 81*b*. The main body 81*a* is shaped in an elongated rectangular plate form such that a longitudinal direction of the main body 81*a* coincides with the axial direction of the X axis, and each of the extensions 81*b* is bent and extends from the main body 81*a* in a direction, which intersects the longitudinal direction of the main body 81*a*. Similarly, the secondary magnetic flux guide member 82 includes a main body 82*a* and the extensions 82*b*. The main body 82*a* is shaped in an elongated rectangular plate form such that a longitudinal direction of the main body 82*a* coincides with the axial direction of the X axis, and each of the extensions 82*b* is bent and extends from the main body 81*a* in a direction, which intersects the longitudinal direction of the main body 82*a*.

The number of the extensions 81*b*, 82*b* of the primary and secondary magnetic flux guide members 81, 82 corresponds to the number of the magnetic detection elements 70. Specifically, in the present embodiment, since the number of the magnetic detection elements 70 is two, the number of the extensions 81*b*, 82*b* of each of the primary and secondary magnetic flux guide members 81, 82 is two.

Furthermore, in the present embodiment, the primary magnetic flux guide member 81 is fixed to a side surface of the receiving recess 53 through the main body 81*a* by, for example, a bonding agent. Furthermore, in the primary magnetic flux guide member 81, an end portion (hereinafter also referred to as a distal end portion) of each of the extensions 81*b*, which is opposite to the main body 81*a*, is bent to oppose and approach the main body of the corresponding one of the magnetic detection elements 70.

The main body 82*a* of the secondary magnetic flux guide member 82 is fixed to the bottom surface of the receiving recess 53 by, for example, a bonding agent such that the secondary magnetic flux guide member 82 is opposed to the primary magnetic flux guide member 81 in the axial direction. Furthermore, in the secondary magnetic flux guide member 82, an end portion (hereinafter also referred to as a distal end portion) of each of the extensions 82*b*, which is opposite to the main body 82*a*, is bent to oppose and approach the main body of the corresponding one of the magnetic detection elements 70 and is inserted into the opening 63. Specifically, the secondary magnetic flux guide member 82 is placed at the receiving recess 53 such that at least a portion of the secondary magnetic flux guide member 82 is inserted into the opening 63.

Therefore, the magnetic sensor 40 is arranged such that the magnetic detection elements 70 are placed between the primary magnetic flux guide member 81 and the secondary magnetic flux guide member 82. Specifically, the magnetic sensor 40 is arranged such that the secondary magnetic flux guide member 82, the magnetic detection elements 70 and the primary magnetic flux guide member 81 are fixed to the common sensor housing 50. Thus, the magnetic sensor 40 of the present embodiment can limit occurrence of a deviation in the positional relationship between the magnetic detection elements 70 and the primary and secondary magnetic flux guide members 81, 82 in comparison to a case where a member, which supports the magnetic detection elements 70, and a member, which supports the primary and secondary magnetic flux guide members 81, 82, are provided separately and are then integrated together.

The distal end portions of the extensions 81*b* of the primary magnetic flux guide member 81 and the distal end portions of the extensions 82*b* of the secondary magnetic flux guide member 82 may be spaced from the magnetic detection elements 70 or may be in contact with the magnetic detection elements 70. Furthermore, the primary magnetic flux guide member 81 and the secondary magnetic flux guide member 82 are arranged such that the main bodies 81*a*, 82*a* are placed at the one end portion side of the sensor housing 50, and the extensions 81*b*, 82*b* extend from the main bodies 81*a*, 82*a* toward the other end portion side of the sensor housing 50.

The cover material 90, which has a waterproof property and is for integrally covering and fixing the circuit board 60, the magnetic detection elements 70 and the primary and secondary magnetic flux guide members 81, 82, is arranged in the receiving recess 53. Therefore, exposure of the circuit board 60 to the water is limited, and a change in the positional relationship of the magnetic detection elements 70 and the primary and secondary magnetic flux guide members 81, 82 is limited. The cover material 90 is made of, for example, epoxy resin.

The structure of the magnetic sensor 40 of the present embodiment has been described. At the time of assembling the torque detection device 10, the magnetic sensor 40 is arranged such that the one end portion side of the sensor housing 50 faces the primary yoke 310 and the secondary yoke 320.

Figure 8:
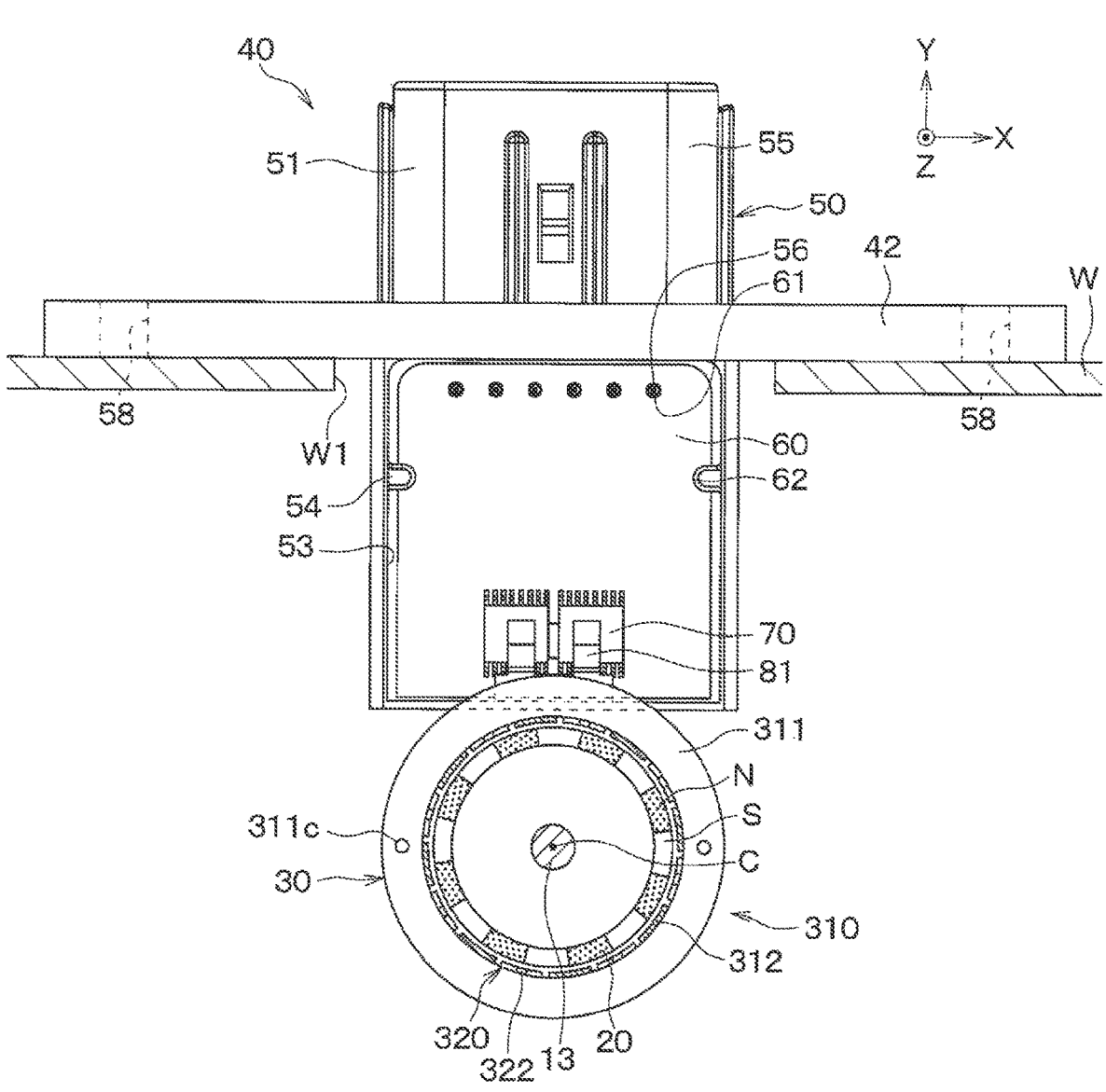
FIG. 8 is a schematic view showing the torque detection device, in which the magnetic sensor is installed at a receiving wall.

Specifically, as shown in FIG. 8, the multipole magnet 20 and the yoke member 30 are received at an inside of the receiving wall W. In FIG. 8, the primary yoke 310 and the secondary yoke 320 of the yoke member 30 are indicated while the primary yoke 310 and the secondary yoke 320 are shown in a simplified manner for easy understanding. In FIG. 8, the N-poles, the torsion bar 13 and the primary teeth 312 are indicated with hatching. Furthermore, in the present embodiment, the receiving wall W is a wall material that forms the casing of the electric power steering device 1 shown in FIG. 1 and rotatably supports and covers the first shaft 11 and the second shaft 12. An installation hole W1, which is a through-hole, is formed at the receiving wall W.

The magnetic sensor 40 is fixed to the receiving wall W such that the one end portion side of the sensor housing 50 is inserted through the installation hole W1 of the receiving wall W. Specifically, the magnetic sensor 40 is arranged such that a lower end surface of the flange 52 contacts an outer wall surface (i.e., an upper surface in FIG. 8) of the receiving wall W located around the installation hole W1. Here, the lower end surface of the flange 52 refers to a surface of the flange 52 which is located on the side where the one end portion of the sensor housing 50 is placed. The magnetic sensor 40 is fixed to the receiving wall W when bolts (not shown) or the like are fixed to the receiving wall W through the fixing holes 58.

Furthermore, the magnetic sensor 40 is arranged such that the primary magnetic flux guide member 81 is magnetically coupled with the primary yoke 310, and the secondary magnetic flux guide member 82 is magnetically coupled with the secondary yoke 320. In the present embodiment, the magnetic sensor 40 is also arranged such that the primary magnetic flux guide member 81 is opposed to the primary ring plate 311 of the primary yoke 310 in the axial direction, and the secondary magnetic flux guide member 82 is opposed to the secondary ring plate 321 of the secondary yoke 320 in the axial direction. Specifically, the magnetic sensor 40 is arranged such that the primary magnetic flux guide member 81 and the secondary magnetic flux guide member 82 are positioned within the groove 341 formed at the yoke member 30. That is, in the present embodiment, the yoke member 30 has the groove 341 at the outer peripheral surface 340b to place the primary magnetic flux guide member 81 and the secondary magnetic flux guide member 82 in the above-described manner. In the torque detection device 10, the primary magnetic flux guide member 81 and the secondary magnetic flux guide member 82 are placed at the part of the region between the primary ring plate 311 of the primary yoke 310 and the secondary ring plate 321 of the secondary yoke 320.

In contrast, as discussed above, when the torsional torque is generated at the torsion bar 13, the magnetic flux, which corresponds to this torsion, is generated between the primary yoke 310 and the secondary yoke 320, and this magnetic flux is guided to the magnetic detection elements 70 through the primary and secondary magnetic flux guide members 81, 82. Therefore, the measurement signal, which corresponds to the magnetic flux, is outputted from the magnetic detection elements 70.

The structure of the torque detection device 10 of the present embodiment has been described. In this torque detection device 10, it is possible to limit a deterioration in the detection accuracy in a case where the central axis of the multipole magnet 20 and the central axis of the yoke member 30 deviate from each other. Hereinafter, with reference to FIGS. 9 to 11, a principle of limiting the deterioration in the detection accuracy will be described under the assumption that the central axis of the multipole magnet 20 is defined as a central axis C20, and the central axis of the yoke member 30 is defined as a central axis C30.

Figure 9:
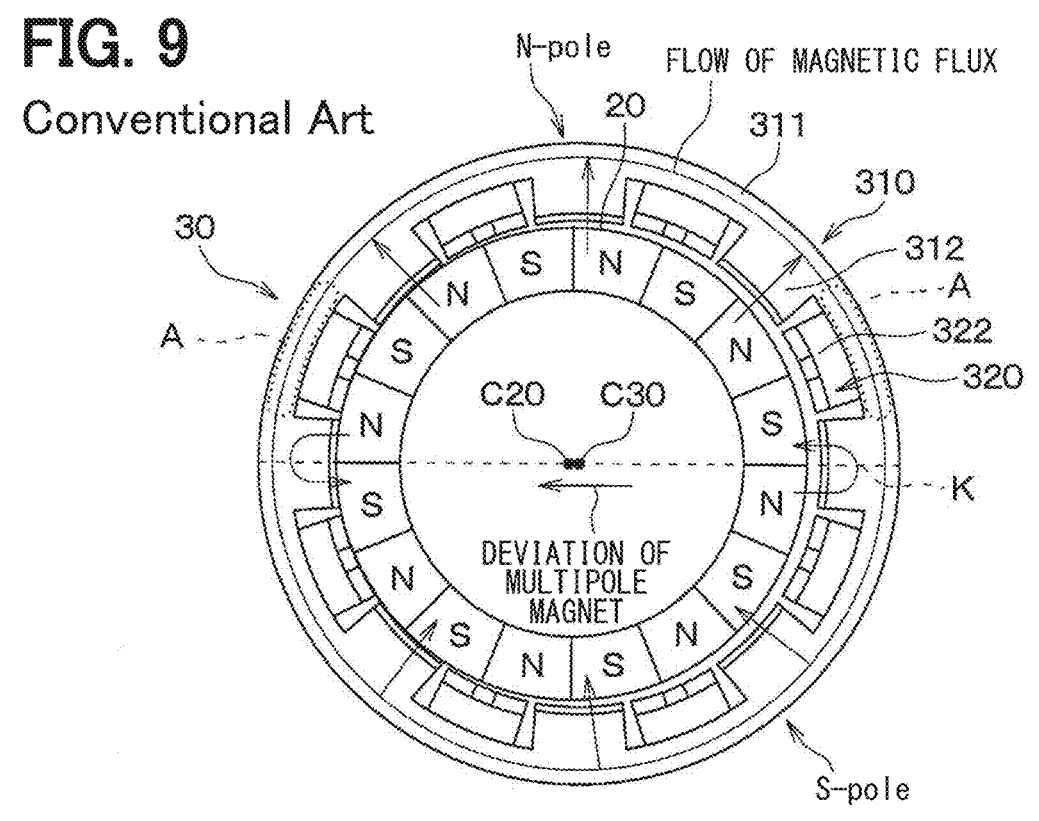
FIG. 9 is a plan view for explaining magnetic poles generated in the yoke member when a deviation occurs between a central axis of the multipole magnet and a central axis of the yoke member.
Figure 10:
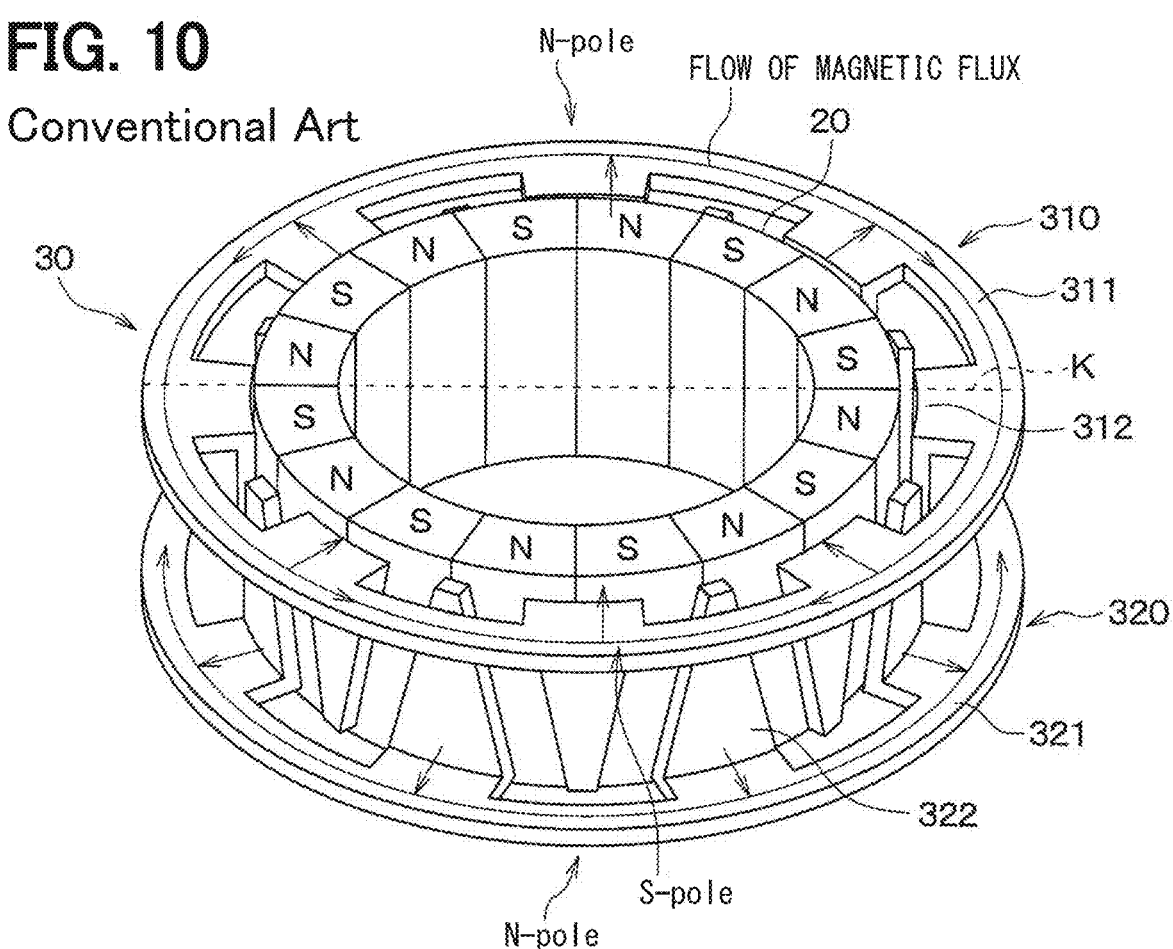
FIG. 10 is a perspective view for explaining the magnetic poles generated in the yoke member when the deviation occurs between the central axis of the multipole magnet and the central axis of the yoke member.

In FIGS. 9 and 10, the indication of the holder member 340 of the yoke member 30 is omitted for the sake of simplicity. Furthermore, in FIGS. 9 and 10, there is shown a comparative example of a previously proposed yoke member 30, in which the primary and secondary yokes 310, 320 are configured such that the maximum width L1 of each of the primary and secondary teeth 312, 322 is larger than a minimum width L2 of each of the primary and secondary ring plates 311, 321. Hereinafter, this previously proposed yoke member 30 will be also referred to as a conventional yoke member 30.

As shown in FIGS. 9 and 10, in the case where the central axis C20 of the multipole magnet 20 and the central axis C30 of the yoke member 30 deviate from each other, a path of the magnetic flux is generated at the primary ring plate 311 and the secondary ring plate 321, and thereby magnetic poles of N-poles and S-poles are generated at the primary ring plate 311 and the secondary ring plate 321. The path of the magnetic flux can be also said to be a flow of the magnetic flux. Specifically, in each of the primary ring plate 311 and the secondary ring plate 321, a portion, which intersects an imaginary straight line K that passes through the central axis C20 of the multipole magnet 20 and the central axis C30 of the yoke member 30, is defined as a boundary, and the N-pole is formed in one region located on one side of this portion, and the S-pole is formed in another region located on the other side of this portion.

The primary yoke 310 and the secondary yoke 320 are opposed to each other while the primary teeth 312 of the primary yoke 310 and the secondary teeth 322 of the secondary yoke 320 are alternately arranged in the circumferential direction. Therefore, a positional relationship of the S-pole and the N-pole generated at the primary ring plate 311 and a positional relationship between the S-pole and the N-pole generated at the secondary ring plate 321 are opposite to each other, i.e., are reversed relative to each other.

Figure 11:
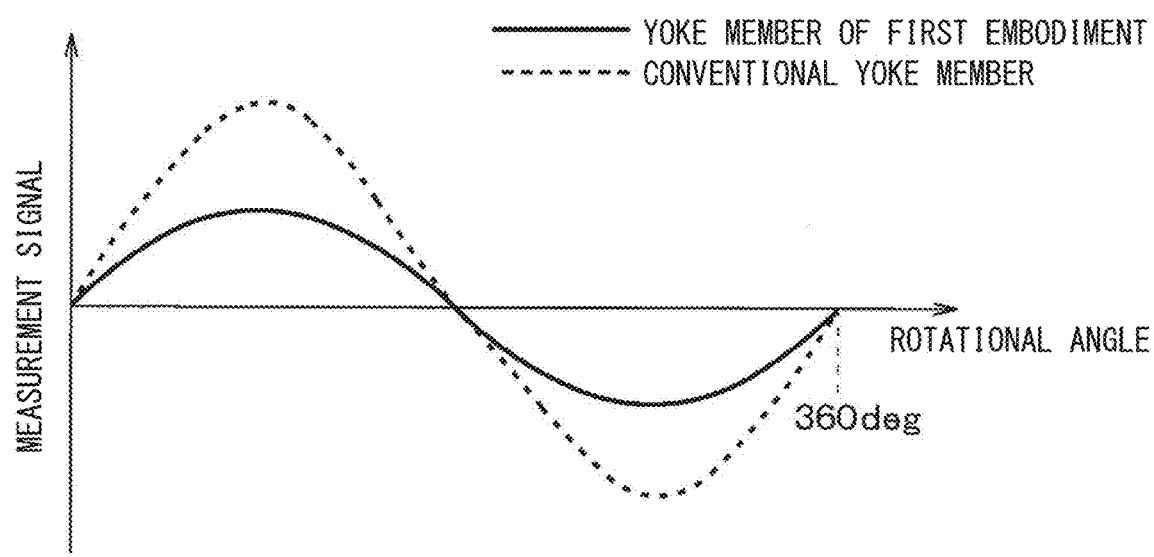
FIG. 11 is a diagram showing a relationship between a measurement signal and a rotational angle.

In this case, a measurement signal, which is outputted from the magnetic sensor 40 of the torque detection device 10 is influenced by the magnetic poles generated at the primary and secondary ring plates 311, 321. For example, in a case where the multipole magnet 20 and the yoke member 30 are simultaneously rotated, it is ideal that the measurement signal, which is outputted from the magnetic sensor 40, is constant. However, when the magnetic poles are generated at the primary and secondary ring plates 311, 321, an output fluctuation (i.e., an output oscillation) occurs at every 360 degree cycle, as shown in FIG. 11. The simultaneous rotation of the multipole magnet 20 and the yoke member 30 refers to rotation of the multipole magnet 20 and the yoke member 30 in a state where a relative position between the multipole magnet 20 and the yoke member 30 is not changed.

Therefore, in the case where the central axis C20 of the multipole magnet 20 and the central axis C30 of the yoke member 30 deviate from each other, the measurement signal, which is outputted from the magnetic sensor 40, is influenced by the output fluctuation shown in FIG. 11 even at the time of detecting the torsional torque of the torsion bar 13. Thus, in the case where the central axis C20 of the multipole magnet 20 and the central axis C30 of the yoke member 30 deviate from each other, the detection accuracy is deteriorated by the influence of the magnetic poles generated at the primary and secondary ring plates 311, 321.

In contrast, in the present embodiment, as discussed above, the primary and secondary yokes 310, 320 are configured such that the maximum width L1 of each of the primary and secondary teeth 312, 322 is smaller than the minimum width L2 of the corresponding one of the primary and secondary ring plates 311, 321. Therefore, the strength of the magnetic poles, which are generated at the primary and secondary ring plates 311, 321, can be reduced.

Specifically, in the case where the central axis C20 of the multipole magnet 20 and the central axis C30 of the yoke member 30 deviate from each other, the path of the magnetic flux is changed to flow from the primary and secondary teeth 312, 322 to the primary and secondary ring plates 311, 321, respectively. Thus, by setting the maximum width L1 of each of the primary and secondary teeth 312, 322 to be smaller than the minimum width L2 of the corresponding one of the primary and secondary ring plates 311, 321, the amount of the magnetic flux, which is guided from the multipole magnet 20 to each of the primary and secondary teeth 312, 322, can be reduced. Thereby, the amount of the magnetic flux, which is guided from each of the primary and secondary teeth 312, 322 to the corresponding one of the primary and secondary ring plates 311, 321, can be reduced. As a result, the strength of the magnetic poles, which are generated at the primary and secondary ring plates 311, 321, can be reduced. In the present embodiment, by setting the maximum width L1 to be smaller than the minimum width L2, the amount of the magnetic flux, which is guided from each of the primary and secondary teeth 312, 322 to the corresponding one of the primary and secondary ring plates 311, 321, is reduced. Therefore, by setting the maximum width L1 smaller than the minimum width L2, there is formed a reducing portion that reduces the magnetic flux density of the magnetic flux which flows in the corresponding one of the primary and secondary ring plates 311, 321.

In this way, for example, in the case where the multipole magnet 20 and the yoke member 30 are simultaneously rotated, the measurement signal, which is outputted from the magnetic sensor 40 of the present embodiment, will have a smaller output fluctuation in comparison to the conventional yoke member 30, as shown in FIG. 11. Therefore, the torque detection device 10 of the present embodiment can limit the deterioration of the detection accuracy.

Furthermore, in the case where the central axis C20 of the multipole magnet 20 and the central axis C30 of the yoke member 30 deviate from each other, for example, in the primary yoke 310, as shown in FIG. 9, the magnetic flux density is likely to be the highest in each of regions A, each of which is adjacent to the corresponding secondary tooth 322 located adjacent to the imaginary straight line K, in the portion of the primary ring plate 311 that forms the N-pole in the primary ring plate 311. Similarly, although not shown in the drawings, in the secondary yoke 320, the magnetic flux density is likely to be the highest in each of regions, each of which is adjacent to the corresponding primary tooth 312 located adjacent to the imaginary straight line K, in the portion of the secondary ring plate 321 that forms the N-pole in the secondary ring plate 321.

Figure 12:
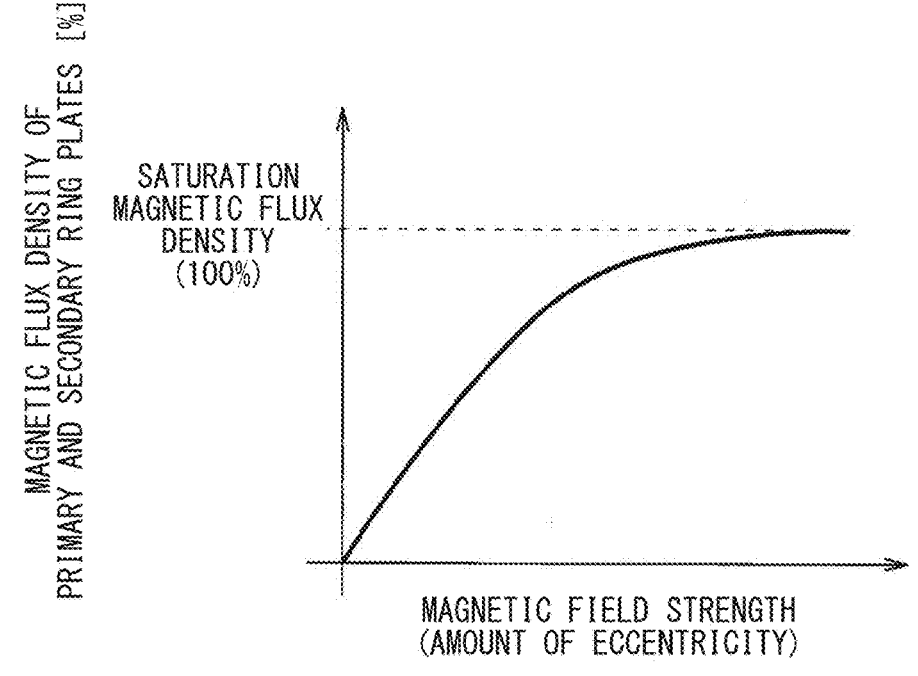
FIG. 12 is a diagram showing a relationship between magnetic field strength and a magnetic flux density of primary and secondary ring plates.
Figures 13, 14:
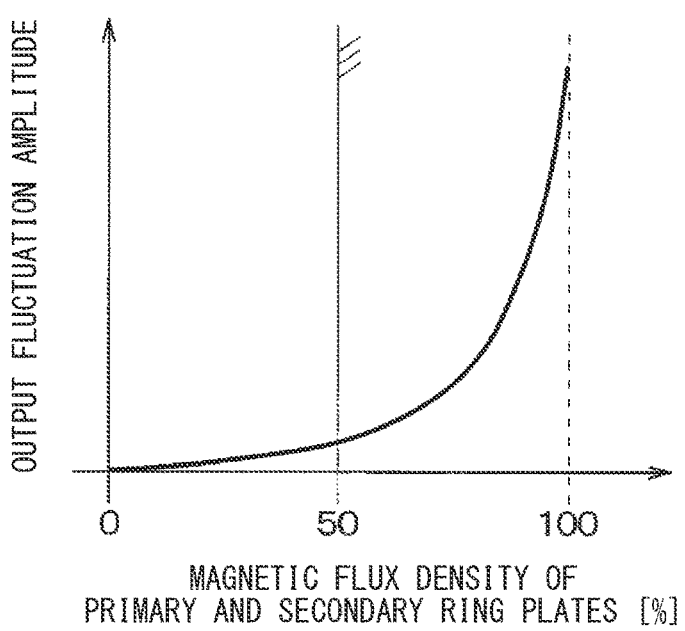
FIG. 13 is a diagram showing a relationship between a magnetic flux density of the primary and secondary ring plates and an output fluctuation amplitude at a time of occurrence of the maximum eccentricity of the multi-polar magnet.
FIG. 14 is a plan view for explaining magnetic poles generated in the yoke member when the deviation occurs between the central axis of the multipole magnet and the central axis of the yoke member in a case where the number of the magnetic poles of the multipole magnet is twenty four.

As shown in FIG. 12, when the amount of deviation (the amount of eccentricity) of the multipole magnet 20 is increased to cause an increase in the magnetic field strength, the magnetic flux density of the primary and secondary ring plates 311, 321 is increased. In this case, according to the study of the inventors of the present application, as shown in FIG. 13, when the amount of deviation between the central axis C20 of the multipole magnet 20 and the central axis C30 of the yoke member 30 is maximized (i.e., the time of occurrence of the maximum eccentricity), the following point is confirmed. Specifically, when the maximum density of the magnetic flux generated at each of the primary and secondary ring plates 311, 321 is equal to or smaller than 50% of the saturation magnetic flux density of this ring plate 311, 321, the output fluctuation can be significantly limited. That is, there is confirmed that the deterioration of the detection accuracy can be significantly limited. Therefore, it is desirable that the primary and secondary yokes 310, 320 are configured such that the maximum width L1 and the minimum width L2 are adjusted in such a way that the maximum density of the magnetic flux generated at each of the primary and secondary ring plates 311, 321 becomes equal to or smaller than 50% of the saturation magnetic flux density of this ring plate 311, 321 at the time of occurrence of the maximum eccentricity of the multipole magnet 20.

As described above, in the present embodiment, the yoke member 30 is configured such that the maximum width L1 of each of the primary and secondary teeth 312, 322 is smaller than the minimum width L2 of the corresponding one of the primary and secondary ring plates 311, 321. Therefore, the amount of the magnetic flux, which is guided from the multipole magnet 20 to each of the primary and secondary teeth 312, 322, can be reduced, and thereby the amount of the magnetic flux, which is guided from each of the primary and secondary teeth 312, 322 to the corresponding one of the primary and secondary ring plates 311, 321, can be reduced. Thus, the strength of the magnetic poles, which are generated at the primary and secondary ring plates 311, 321, can be reduced, and thereby the deterioration of the detection accuracy can be limited even when the central axis C20 of the multipole magnet 20 and the central axis C30 of the yoke member 30 deviate from each other in the torque detection device 10.

Particularly, the torque detection device 10 of the present embodiment is formed such that the primary and secondary magnetic flux guide members 81, 82 are placed at the part of the region between the primary ring plate 311 of the primary yoke 310 and the secondary ring plate 321 of the secondary yoke 320. Specifically, the torque detection device 10 of the present embodiment can reduce the size of the primary and secondary magnetic flux guide members 81, 82 in comparison to a torque detection device that has magnetic flux guide members, each of which is shaped in a ring form and surrounds the primary and secondary yokes 310, 320 such that the magnetic flux guide member is opposed to the primary and secondary yokes 310, 320 in the radial direction. Therefore, in comparison to this torque detection device, the torque detection device 10 of the present embodiment has a reduced opposing surface area between the primary and secondary yokes 310, 320 and the primary and secondary magnetic flux guide members 81, 82, so that the torque detection device 10 of the present embodiment is likely to be influenced by the deviation between the central axis C20 and the central axis C30. Thus, as described above, by setting the maximum width L1 of each of the primary and secondary teeth 312, 322 to be smaller than the minimum width L2 of the corresponding one of the primary and secondary ring plates 311, 321, it is possible to effectively limit the deterioration of the detection accuracy in the torque detection device 10 of the present embodiment.

Furthermore, as discussed above, the maximum density of the magnetic flux generated at each of the primary and secondary ring plates 311, 321 becomes equal to or smaller than 50% of the saturation magnetic flux density of this ring plate 311, 321 at the time of occurrence of the maximum eccentricity of the multipole magnet 20, so that the output fluctuation can be significantly limited. Specifically, the output fluctuation can be significantly limited when the primary and secondary yokes 310, 320 are formed to adjust the maximum width L1 and the minimum width L2 such that the relationship of the magnetic flux density discussed above is satisfied. That is, it is possible to significantly limit the deterioration of the detection accuracy.

In the first embodiment discussed above, there is described the example where the number of the magnetic poles of the multipole magnet 20 is sixteen. However, the number of the magnetic poles of the multipole magnet 20 can be appropriately changed. For example, the multipole magnet 20 may have a total of twenty four magnetic poles that include twelve N-poles and twelve S-poles. Even in this case, as shown in FIG. 14, when the central axis C20 of the multipole magnet 20 and the central axis C30 of the yoke member 30 deviate from each other, the phenomenon, which is similar to the above-described phenomenon, occurs. Specifically, in each of the primary ring plate 311 and the secondary ring plate 321, the portion, which intersects the imaginary straight line K that passes through the central axis C20 of the multipole magnet 20 and the central axis C30 of the yoke member 30, is defined as the boundary, and the N-pole is formed in the one region located on the one side of this portion, and the S-pole is formed in the other region located on the other side of this portion. Therefore, when the primary and secondary yokes 310, 320 are formed such that the maximum width L1 of each of the primary and secondary teeth 312, 322 is smaller than the minimum width L2 of the corresponding one of the primary and secondary ring plates 311, 321, it is possible to limit the deterioration of the detection accuracy.

Second Embodiment

A second embodiment will be described. The present embodiment is a modification of the first embodiment, in which each of the primary ring plate 311 and the secondary ring plate 321 has ring plate side fixing portions. The rest of the structure of the present embodiment is the same as that of the first embodiment and will not be described redundantly for the sake of simplicity.

Figure 15:
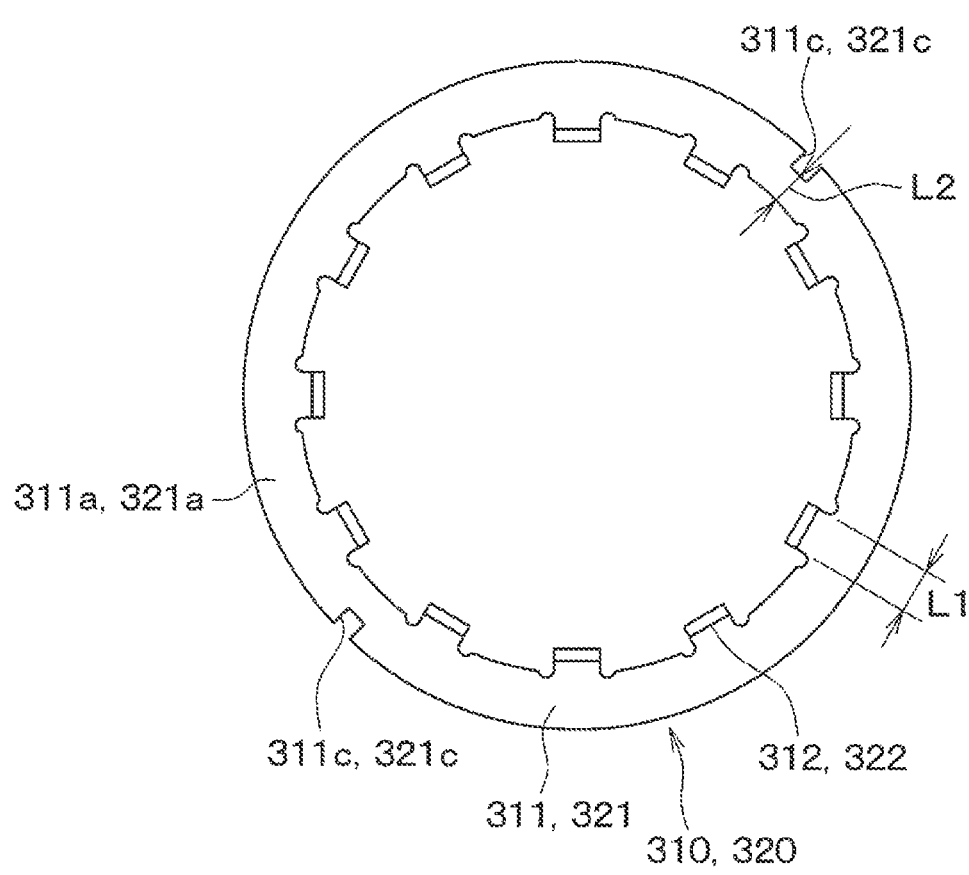
FIG. 15 is a plan view of primary and secondary yokes of a second embodiment.

In the present embodiment, as shown in FIG. 15, each of the primary and secondary ring plates 311, 321 has positioning recesses 311$c$, 321$c$ each of which is a cutout formed by removing a portion of the outer periphery of the ring plate 311, 321. The positioning recesses 311$c$, 321$c$ of the primary and secondary ring plates 311, 321 are fitted to molding die side fixing portions, which are formed at a molding die, to fix the primary and secondary ring plates 311, 321 to the molding die when the holder member 340 is molded by filling molten resin into the molding die after placement of the primary and secondary ring plates 311, 321 in the molding die. That is, the positioning recesses 311$c$, 321$c$ are provided to limit a positional deviation between the primary ring plate 311 and the secondary ring plate 321 at the time of placing the primary and secondary ring plates 311, 321 in the molding die. Furthermore, in the present embodiment, the positioning recesses 311$c$, 321$c$ correspond to the ring plate side fixing portions.

In the case where the positioning recesses 311$c$, 321$c$ are formed at the primary and secondary ring plates 311, 321, the minimum width L2 of each of the primary and secondary ring plates 311, 321 of the present embodiment are defined as follows. Specifically, as discussed above, the inner periphery and the outer periphery of each of the primary and secondary ring plates 311, 321 are respectively shaped generally in the circular form. Therefore, the minimum width L2 of each of the primary and secondary ring plates 311, 321 is a width of the portion of the ring plate 311, 321 at which the positioning recess 311$c$, 321$c$ is formed and is more specifically a width of a remaining portion of the ring plate 311, 321, at which the positioning recesses 311$c$, 321$c$ is cut out to leave the remaining portion. That is, the minimum width L2 of the present embodiment is a radial length between the inner periphery of the ring plate 311, 321 and a bottom surface of the positioning recess 311$c$, 321$c$.

The advantages, which are similar to those of the first embodiment, can be achieved even in the case where the width of the portion of the ring plate 311, 321, at which the positioning recess 311$c$, 321$c$ is formed, is the minimum width L2 of the ring plate 311, 321. In a case where the inner periphery and the outer periphery of each of the primary and secondary ring plates 311, 321 are not shaped generally in the circular form, and the width of the portion of the ring plate 311, 321, at which the positioning recess 311$c$, 321$c$ is formed, does not become the minimum width of the ring plate 311, 321, the minimum width L2 of the ring plate 311, 321 is defined in a manner similar to that of the first embodiment.

Furthermore, in the above description, there is described the example where the positioning recesses 311$c$, 321$c$ are formed at both of the primary and secondary ring plates 311, 321. However, the positioning recess(es) may be formed at only one of the primary and secondary ring plates 311, 321. Furthermore, the positioning recesses 311$c$, 321$c$, which serve as the ring plate side fixing portions, may be formed at the inner periphery of each of the primary and secondary ring plates 311, 321 instead of the outer periphery of each of the primary and secondary ring plates 311, 321. Furthermore, the positioning recesses 311$c$, 321$c$ may be formed at an intermediate portion of each of the primary and secondary ring plates 311, 321, which is radially located between the inner periphery and the outer periphery of the ring plate 311, 321. In the case where the ring plate side fixing portion(s) is formed at the intermediate portion of the respective primary and secondary ring plates 311, 321, the ring plate side fixing portion(s) may be referred to as a positioning hole(s).

Third Embodiment

A third embodiment will be described. The present embodiment is a modification of the first embodiment, in which the configurations of the primary magnetic flux guide member 81 and the secondary magnetic flux guide member 82 are changed. The rest of the structure of the present embodiment is the same as that of the first embodiment and will not be described redundantly for the sake of simplicity.

Figure 16:
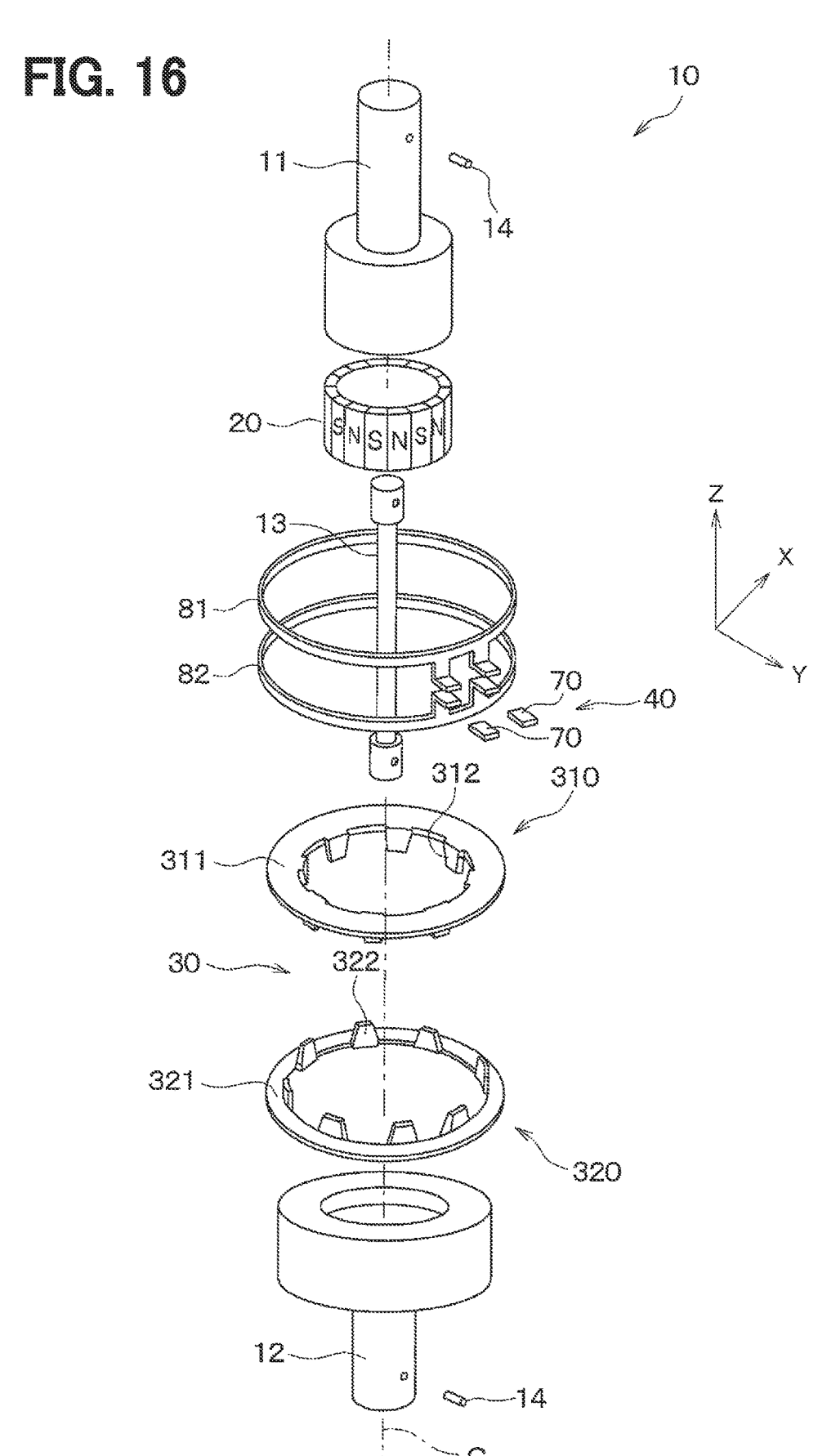
FIG. 16 is an exploded perspective view of a torque detection device of a third embodiment.

In the present embodiment, as shown in FIG. 16, each of the primary and secondary magnetic flux guide members 81, 82 is shaped in a ring form and has a diameter that is larger than an outer diameter of each of the primary and secondary ring plates 311, 321. The primary and secondary magnetic flux guide members 81, 82 are opposed to the primary and secondary ring plates 311, 321 in the radial direction. The primary and secondary magnetic flux guide members 81, 82 of the present embodiment are formed separately from the sensor housing 50.

Even with the above torque detection device 10, in which the primary and secondary magnetic flux guide members 81, 82 are opposed to the primary and secondary ring plates 311,

321 in the radial direction, the advantages, which are similar to those of the first embodiment, can be achieved. In the above description, each of the primary and secondary magnetic flux guide members 81, 82 is shaped in the complete ring form. However, each of the primary and secondary magnetic flux guide members 81, 82 is not necessarily shaped in the complete ring form and may be shaped in, for example, a semicircular form. Furthermore, in the above case where the primary and secondary magnetic flux guide members 81, 82 are opposed to the primary and secondary ring plates 311, 321 in the radial direction, the groove 341 may not be formed at the outer peripheral surface 340b of the holder member 340.

Fourth Embodiment

A fourth embodiment will be described. The present embodiment is a modification of the second embodiment, in which projections are added to each of the primary ring plate 311 and the secondary ring plate 321. The rest of the structure of the present embodiment is the same as that of the second embodiment and will not be described redundantly for the sake of simplicity.

Figure 17:
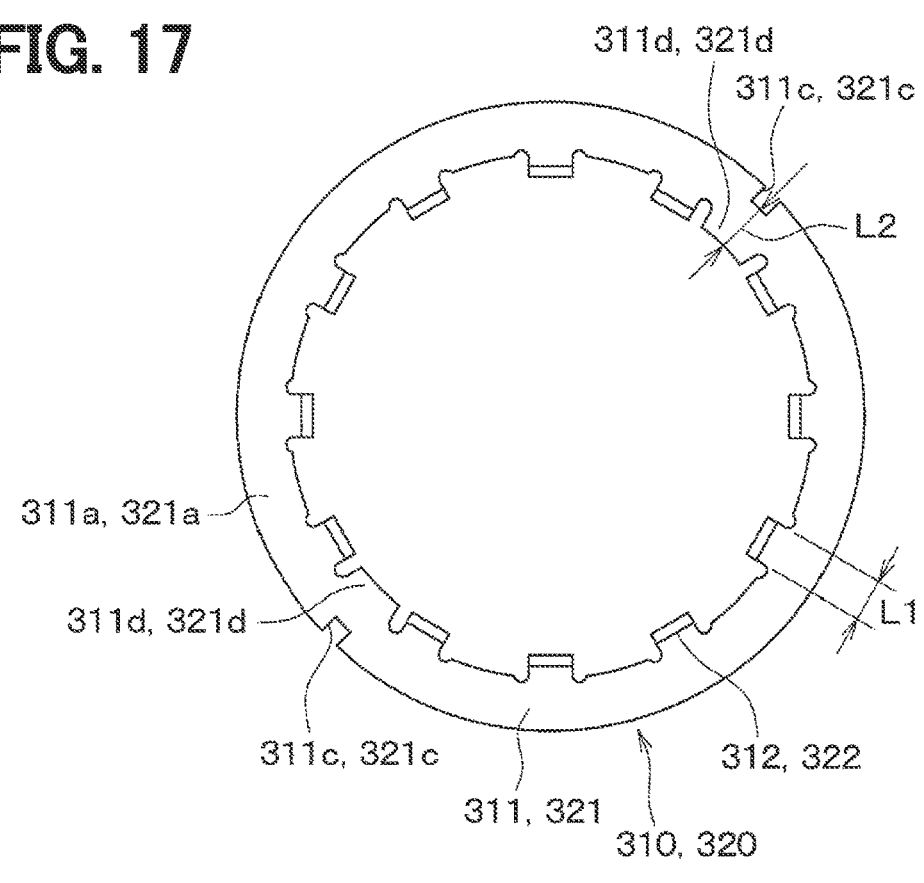
FIG. 17 is a plan view of primary and secondary yokes of a fourth embodiment.

In the present embodiment, as shown in FIG. 17, each of the primary and secondary ring plates 311, 321 has the positioning recesses 311c, 321c, each of which is the cutout formed by removing the portion of the outer periphery of the ring plate 311, 321. Furthermore, each of the primary and secondary ring plates 311, 321 has projections 311d, 321d, each of which is formed at the inner periphery of the ring plate 311, 321 to increase a size of the reduced portion of the ring plate 311, 321 that is reduced by the positioning recess 311c, 321c.

Specifically, each of the projections 311d, 321d is formed at the corresponding portion of the ring plate 311, 321 which intersect an imaginary straight line that extends through the corresponding positioning recess 311c, 321c in the radial direction. In the present embodiment, each of the projections 311d, 321d is formed to project radially inwardly at the inner periphery of the ring plate 311, 321 which is radially opposed to the portion of the outer periphery at which the corresponding positioning recess 311c, 321c is formed.

In this way, the removed portions of each of the primary and secondary ring plates 311, 321, which are removed by forming the positioning recesses 311c, 321c, are compensated by the projections 311d, 321d. Therefore, in each of the primary and secondary ring plates 311, 321, a cross-sectional area of each corresponding portion, at which the positioning recess 311c, 321c is formed, can be increased in the direction perpendicular to the circumferential direction. That is, each of the projections 311d, 321d serves as a cross-sectional area increasing portion of the corresponding one of the primary and secondary ring plates 311, 321. Therefore, in comparison to the second embodiment, the saturation magnetic flux density of each of the primary and secondary ring plates 311, 321 can be increased, and thereby the generation of the output fluctuation can be limited.

In FIG. 17, a width of the portion of each of the primary and secondary ring plates 311, 321, at which the corresponding positioning recess 311c, 321c and the corresponding projection 311d, 321d are formed, is defined as the minimum width L2. However, the minimum width L2 may be a width of another portion of the ring plate 311, 321 which is different from the portion, at which the corresponding positioning recess 311c, 321c and the corresponding projection 311d, 321d are formed.

Modification of Fourth Embodiment

Figure 18:
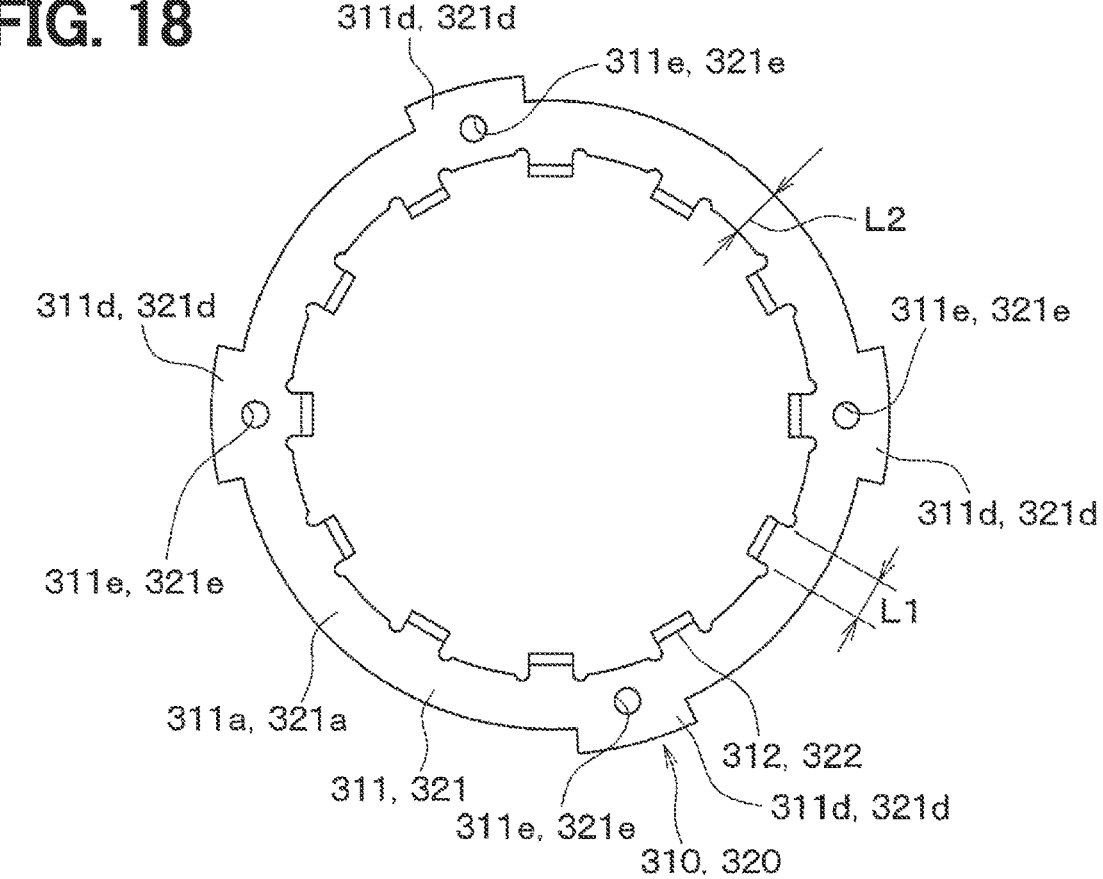
FIG. 18 is a plan view of primary and secondary yokes in a modification of the fourth embodiment.

A modification of the fourth embodiment will be described. In the fourth embodiment, as shown in FIG. 18, positioning holes 311e, 321e, which serve as ring side fixing portions, may be formed at the intermediate portion which is radially located between the inner periphery and the outer periphery of each of the primary and secondary ring plates 311, 321. In this case, each of the projections 311d, 321d may be formed at the corresponding portion that intersects an imaginary straight line which extends in the radial direction and passes through the corresponding positioning hole 311e, 321e. In FIG. 18, since each of the positioning holes 311e, 321e is located between the corresponding one of the primary and secondary teeth 312, 322 and the outer periphery of the corresponding one of the primary and secondary ring plates 311, 321, the projections 311d, 321d are formed at the outer periphery of the corresponding one of the primary and secondary ring plates 311, 321. However, in a case where each of the positioning holes 311e, 321e is located at a different portion of the corresponding one of the primary and secondary ring plates 311, 321 that is different from the portion between the corresponding one of the primary and secondary teeth 312, 322 and the outer periphery of the corresponding one of the primary and secondary ring plates 311, 321, the projections 311d, 321d may be formed at the inner periphery of the corresponding one of the primary and secondary ring plates 311, 321.

Fifth Embodiment

A fifth embodiment will be described. The present embodiment is a modification of the first embodiment, in which reducing portions for reducing the magnetic flux flowing from the primary and secondary teeth 312, 322 to the primary and secondary ring plates 311, 321 are formed. The rest of the structure of the present embodiment is the same as that of the first embodiment and will not be described redundantly for the sake of simplicity.

Figure 19:
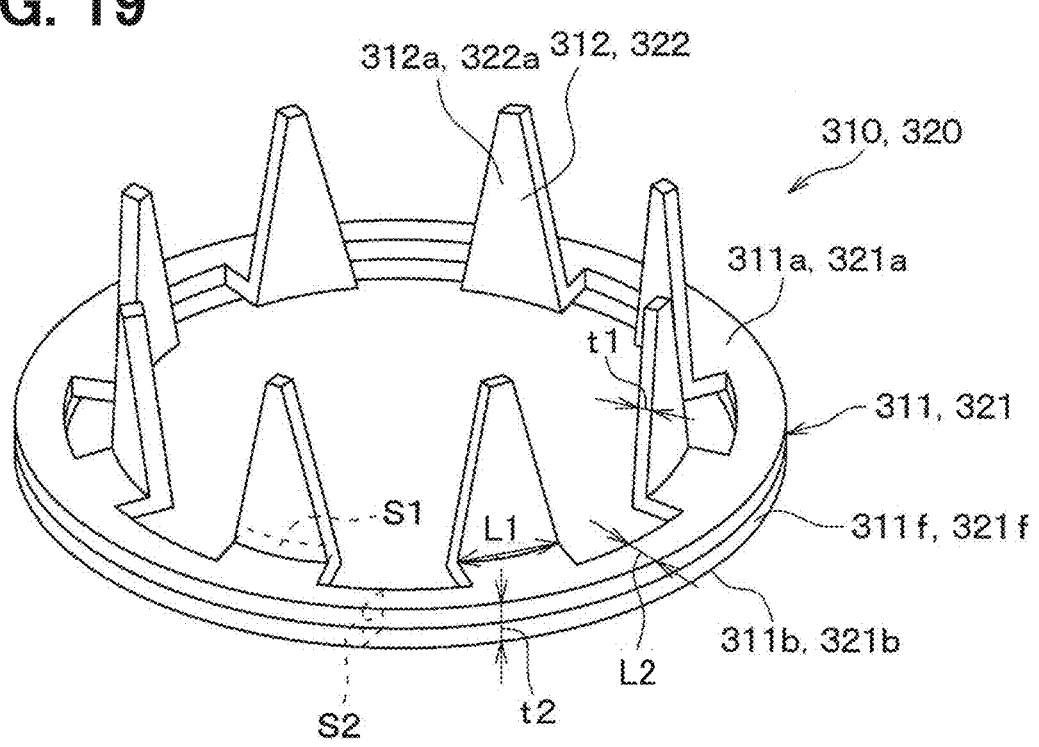
FIG. 19 is a perspective view of primary and secondary yokes of a fifth embodiment.

In the present embodiment, the primary and secondary yokes 310, 320 have the reducing portions that reduce the magnetic flux density of the magnetic flux which flows in the primary and secondary ring plates 311, 321. Specifically, as shown in FIG. 19, each of the primary and secondary ring plates 311, 321 has an auxiliary plate 311f, 321f. The auxiliary plates 311f, 321f are made of the same material that of the primary and secondary yokes 310, 320 and are shaped in a ring plate form like the primary and secondary ring plates 311, 321. A thickness t2 of each of the primary and secondary ring plates 311, 321 is larger than a thickness t1 of each of the primary and secondary teeth 312, 322.

The thickness t1 of each of the primary and secondary teeth 312, 322 refers to a length between the inner surface 312a, 322a of the tooth 312, 322 and an outer surface of the tooth 312, 322 which are opposite to each other. Furthermore, in the present embodiment, each of the auxiliary plates 311f, 321f is arranged to form the other surface 311b, 321b of the corresponding one of the primary and secondary ring plates 311, 321. However, it should be noted that each of the auxiliary plates 311f, 321f may be arranged to form the one surfaces 311a, 321a of the corresponding one of the primary and secondary ring plates 311, 321.

In the present embodiment, each of the primary and secondary ring plates 311, 321 is formed to have the auxiliary plate 311f, 321f. The maximum cross-sectional area S1 of the portion of each of the primary and secondary teeth 312, 322, which is perpendicular to the normal direction, is set to be smaller than the minimum cross-sectional area S2 of the portion of the corresponding one of the primary and secondary ring plates 311, 321, which is perpendicular to the circumferential direction. In the present embodiment, each of the primary and secondary teeth 312, 322 is shaped in a tapered form such that the width of the tooth 312, 322 is progressively reduced from the base to the distal end of the tooth 312, 322, and thereby the maximum cross-sectional area S1 is a cross-sectional area of the base of the tooth 312, 322. In the present embodiment, each of the reducing portions is formed by setting the maximum cross-sectional area S1 of each of the primary and secondary teeth 312, 322 to be smaller than the minimum cross-sectional area S2 of the corresponding one of the primary and secondary ring plates 311, 321.

Furthermore, in the present embodiment, the maximum width L1 and the minimum width L2 are set to be in a range of 3 mm to 4 mm based on workability and the like at the time of manufacturing the primary and secondary yokes 310, 320. Furthermore, the thickness t2 of each of the primary and secondary ring plates 311, 321 having the auxiliary plate 311f, 321f is set to be in a range of 0.8 mm to 1.2 mm. That is, in the primary and secondary yokes 310, 320 of the present embodiment, the maximum width L1 of each of the primary and secondary teeth 312, 322 and the thickness t2 of each of the primary and secondary ring plates 311, 321 are set such that a ratio of the maximum width L1 relative to the thickness t2 is equal to or larger than 2.5. Furthermore, in the primary and secondary yokes 310, 320, the minimum width L2 and the thickness t2 of each of the primary and secondary ring plates 311, 321 are set such that a ratio of the minimum width L2 relative to the thickness t2 is equal to or larger than 2.5. Furthermore, the maximum cross-sectional area S1 (i.e., the cross-sectional area of the base) of each of the primary and secondary teeth 312, 322 is set to be equal to or larger than 2.4 mm². However, the maximum cross-sectional area S1 of each of the primary and secondary teeth 312, 322 is set to be smaller than the minimum cross-sectional area S2 of the corresponding one of the primary and secondary ring plates 311, 321.

In the present embodiment described above, the primary and secondary yokes 310, 320 are formed such that the maximum cross-sectional area S1 of each of the primary and secondary teeth 312, 322 is smaller than the minimum cross-sectional area S2 of the corresponding one of the primary and secondary ring plates 311, 321. Therefore, the amount of the magnetic flux, which is guided from the multipole magnet 20 to each of the primary and secondary teeth 312, 322, can be reduced in comparison to a case where the maximum cross-sectional area S1 of each of the primary and secondary teeth 312, 322 is set to be equal to or larger than the minimum cross-sectional area S2 of the corresponding one of the primary and secondary ring plates 311, 321. Thereby, the amount of the magnetic flux, which is guided from each of the primary and secondary teeth 312, 322 to the corresponding one of the primary and secondary ring plates 311, 321, can be reduced. Thus, the strength of the magnetic poles, which are generated at the primary and secondary ring plates 311, 321, can be reduced, and thereby the deterioration of the detection accuracy can be limited even when the central axis C20 of the multipole magnet 20 and the central axis C30 of the yoke member 30 deviate from each other in the torque detection device 10.

Furthermore, in the present embodiment, the thickness t2 of each of the primary and secondary ring plates 311, 321 is changed by providing the auxiliary plate 311f, 321f. Specifically, the minimum cross-sectional area S2 of each of the primary and secondary ring plates 311, 321 is changed. Therefore, the primary and secondary yokes 310, 320 may be formed such that the maximum width L1 is set to be larger than the minimum width L2 if the maximum cross-sectional area S1 of each of the primary and secondary teeth 312, 322 is smaller than the minimum cross-sectional area S2 of the corresponding one of the primary and secondary ring plates 311, 321.

Furthermore, even in the present embodiment, like in the first embodiment described above, it is desirable that the maximum density of the magnetic flux generated at each of the primary and secondary ring plates 311, 321 is equal to or smaller than 50% of the saturation magnetic flux density of this ring plate 311, 321 at the time of occurrence of the maximum eccentricity of the multipole magnet 20. Therefore, it is desirable that the maximum cross-sectional area S1 of each of the primary and secondary teeth 312, 322 and the minimum cross-sectional area S2 of each of the primary and secondary ring plates 311, 321 are adjusted to satisfy the relationship of the magnetic flux density discussed above.

Modification of Fifth Embodiment

A modification of the fifth embodiment will be described. In the fifth embodiment, the thickness t1 of each of the primary and secondary teeth 312, 322 may be reduced such that the thickness t2 of the corresponding one of the primary and secondary ring plates 311, 321 is larger than the thickness t1 of each of the primary and secondary teeth 312, 322. Furthermore, in the fifth embodiment, each of the primary and secondary ring plates 311, 321 may not have the auxiliary plate 311f, 321f, and the thickness of the material, which serves as the base material, of each of the primary and secondary ring plates 311, 321 may be increased. In this case, the thickness of each of the primary and secondary teeth 312, 322 may be increased if the relationship of the fifth embodiment is satisfied.

Sixth Embodiment

A sixth embodiment will be described. The present embodiment is a modification of the fifth embodiment, in which the reducing portions of the primary and secondary yokes 310, 320 are changed from those of the fifth embodiment. The rest of the structure of the present embodiment is the same as that of the fifth embodiment and will not be described redundantly for the sake of simplicity.

Figure 20:
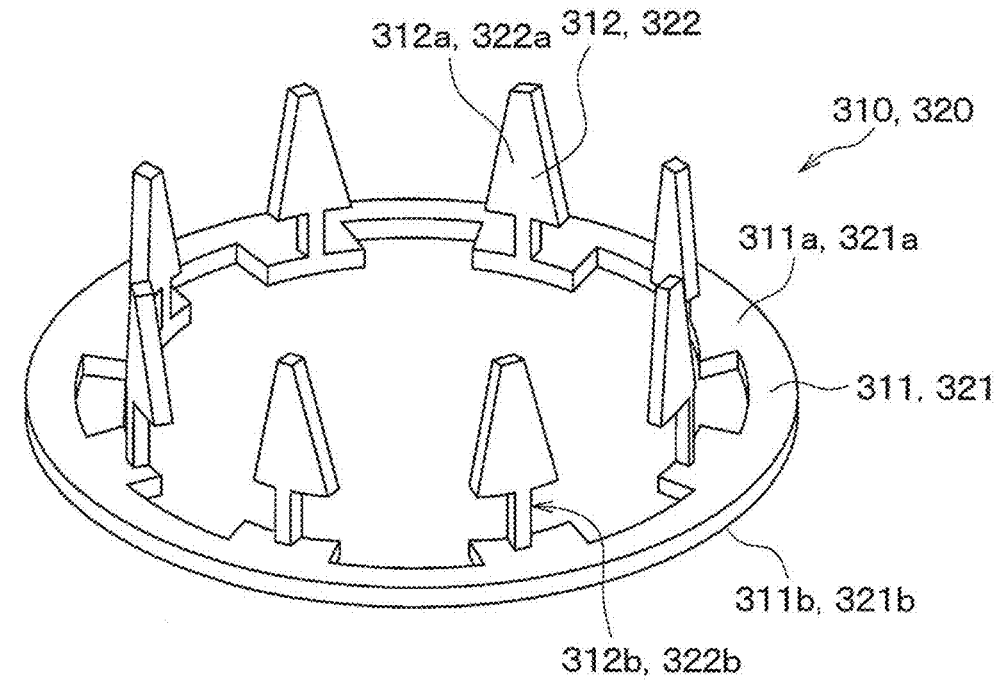
FIG. 20 is a perspective view of primary and secondary yokes of a sixth embodiment.

In the present embodiment, as shown in FIG. 20, each of the primary and secondary teeth 312, 322 has a constriction 312b, 322b, which reduces a cross-sectional area of a portion, which is perpendicular to the normal direction at the tooth 312, 322. In the present embodiment, the constriction 312b, 322b is formed at the base of each of the primary and secondary teeth 312, 322, which is joined to the corresponding one of the primary and secondary ring plates 311, 321 in each of the primary and secondary yokes 310, 320. In the present embodiment, each of the constrictions 312b, 322b serves as the reducing portion.

Accordingly, in each of the primary and secondary yokes 310, 320, the constriction 312b, 322b is formed at each of the primary and secondary teeth 312, 322. Therefore, the amount of magnetic flux, which is guided from the multipole magnet 20 to each of the primary and secondary teeth 312, 322, can be reduced in comparison to a case where the primary and secondary teeth 312, 322 do not have the constrictions 312b, 322b. Thereby, the amount of the magnetic flux, which is guided from each of the primary and secondary teeth 312, 322 to the corresponding one of the primary and secondary ring plates 311, 321, can be reduced. Thus, the advantages, which are similar to those of the fifth embodiment, can be achieved.

Furthermore, in the present embodiment, the constriction 312*b*, 322*b* is formed at the base of each of the primary and secondary teeth 312, 322. Therefore, the amount of the magnetic flux, which is guided from each of the primary and secondary teeth 312, 322 to the corresponding one of the primary and secondary ring plates 311, 321, can be effectively reduced in comparison to, for example, a case where the constriction 312*b*, 322*b* is formed at the distal end portion of each of the primary and secondary teeth 312, 322.

Furthermore, even in the present embodiment, like in the first embodiment described above, it is desirable that the maximum density of the magnetic flux generated at each of the primary and secondary ring plates 311, 321 is equal to or smaller than 50% of the saturation magnetic flux density of this ring plate 311, 321 at the time of occurrence of the maximum eccentricity of the multipole magnet 20. Therefore, it is desirable that the shape of the constriction 312*b*, 322*b*, which is formed at each of the primary and secondary ring plates 311, 321, is adjusted to satisfy the relationship of the magnetic flux density discussed above.

Modification of Sixth Embodiment

Figure 21:
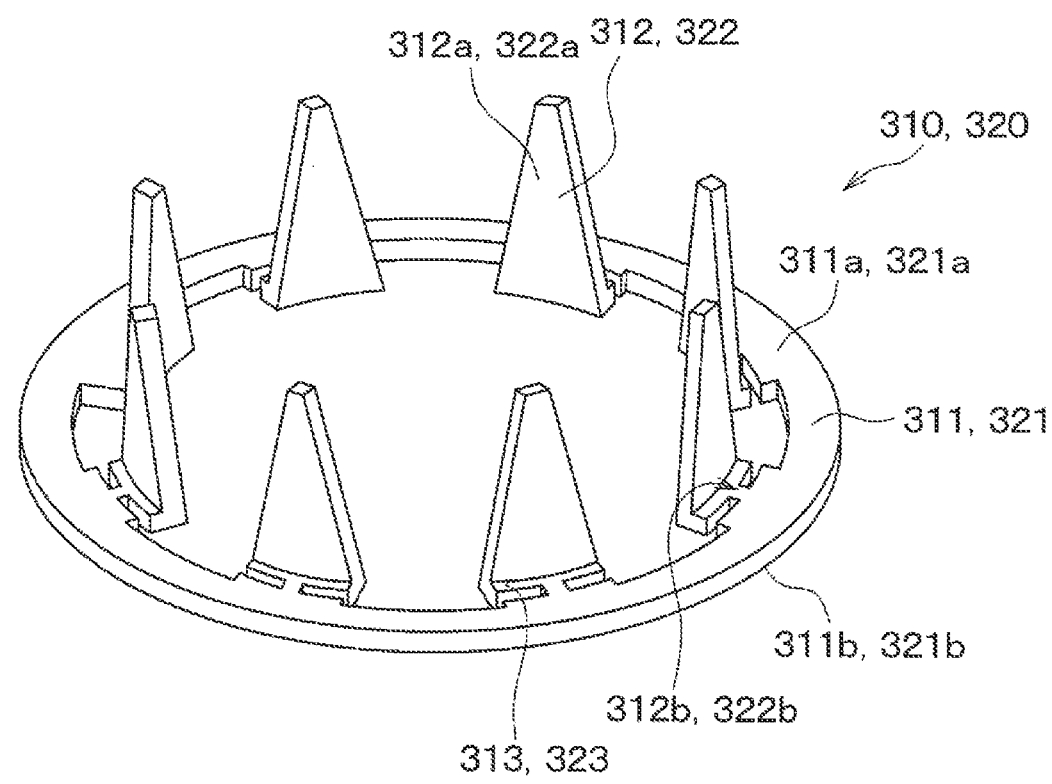
FIG. 21 is a perspective view of primary and secondary yokes in a modification of the sixth embodiment.

A modification of the sixth embodiment will be described. Each of the primary and secondary yokes 310, 320 includes the corresponding ones of the primary and secondary teeth 312, 322 and the corresponding one of the primary and secondary ring plates 311, 321. In this case, more specifically, as shown in FIG. 21, the primary yoke 310 includes primary connecting portions 313, each of which connects between a corresponding one of the primary teeth 312 and the primary ring plate 311, and the secondary yoke 320 includes secondary connecting portions 323, each of which connects between a corresponding one of the secondary teeth 322 and the secondary ring plate 321. The constrictions 312*b*, 322*b* may be formed at the primary and secondary connecting portions 313, 323, respectively. Specifically, each of the constrictions 312*b*, 322*b* may be formed between the corresponding one of the primary and secondary teeth 312, 322 and the corresponding one of the primary and secondary ring plates 311, 321. Even with the above construction of the primary and secondary yokes 310, 320, since the constrictions 312*b*, 322*b* are formed at the primary and secondary connecting portions 313, 323, the amount of the magnetic flux, which is guided from each of the primary and secondary teeth 312, 322 to the corresponding one of the primary and secondary ring plates 311, 321, can be reduced.

Furthermore, although not shown in the drawings, the constriction 312*b*, 322*b*, which is formed at each of the primary and secondary teeth 312, 322, may be formed at, for example, an intermediate portion, which is located between the distal end and the base in each of the primary and secondary teeth 312, 322.

Other Embodiments

Although the present disclosure has been described with reference to the embodiments, it should be understood that the present disclosure is not limited to such embodiments or structures. The present disclosure also includes various modifications and variations within an equivalent range. In addition, various combinations and forms, as well as other combinations and forms that include only one element, more, or less, are within the scope and idea of the present disclosure.

For example, in each of the above embodiments, the column-type electric power steering device has been described as the example. However, each of the above embodiments can be also applied to a rack-type electric power steering device.

Further, in each of the above embodiments, each direction is set for convenience of explanation of the embodiment. Therefore, in many cases, the axial direction of the rotational axis C is in a direction that intersects the vehicle height direction.

Furthermore, in each of the above embodiments, the circuit board 60 may not be installed to the sensor housing 50, and the magnetic detection elements 70 may be directly installed to the sensor housing 50. Furthermore, in each of the above embodiments, the circuit board 60 may not have the opening 63.

Also, any two or more of the above embodiments may be combined as appropriate. For example, the second embodiment may be combined with the third, fifth, or sixth embodiment to form the ring plate side fixing portions in at least one of the primary and secondary ring plates 311, 321. Furthermore, the third embodiment may be combined with any one of the fourth to sixth embodiments to change the structure of the primary and secondary magnetic flux guide members 81, 82. The fifth embodiment may be combined with the sixth embodiment, so that the constrictions 312*b*, 322*b* are formed while the maximum cross-sectional area S1 of each of the primary and secondary teeth 312, 322 is set to be smaller than the minimum cross-sectional area S2 of the corresponding one of the primary and secondary ring plates 311, 321. In addition, the combinations of the above embodiments may be appropriately combined.

What is claimed is:

1. A yoke member for a torque detection device that includes a multipole magnet, the yoke member comprising:
  a primary yoke and a secondary yoke which are opposed to each other and are configured to be disposed around the multipole magnet, wherein:
  the primary yoke has:
    a primary ring plate, which is shaped in a ring form; and
    a plurality of primary teeth, which are arranged at equal intervals along an inner periphery of the primary ring plate and project in a normal direction that is normal to a plane of the primary ring plate;
  the secondary yoke has:
    a secondary ring plate, which is shaped in a ring form; and
    a plurality of secondary teeth, which are arranged at equal intervals along an inner periphery of the secondary ring plate and project in a normal direction that is normal to a plane of the secondary ring plate;
  the primary yoke and the secondary yoke are configured such that the plurality of primary teeth and the plurality of secondary teeth are alternately arranged in a circumferential direction of the primary ring plate, and a predetermined gap is maintained between the primary yoke and the secondary yoke;
  the primary yoke
    is configured such that a maximum width of a widest portion of each of the plurality of primary teeth, which is widest along each of the plurality of primary teeth in an alignment direction of the primary yoke and the secondary yoke, is set to be smaller than a width between the inner periphery and an outer periphery of the primary ring plate at a portion of the primary ring plate which is circumferentially centered between adjacent primary teeth of the plurality of primary teeth, to, when a central axis of the multipole magnet deviates from a central axis of the yoke member with a maximum amount of eccentricity while the yoke member is in use as part of the torque detection device, limit a flow of a magnetic flux flowing from the multipole magnet to the primary ring plate through a corresponding one or more of the plurality of primary teeth, thereby maintaining a maximum density of the magnetic flux generated in the primary ring plate to a level that is smaller than a saturation magnetic flux density of the primary ring plate, and generate a change in a magnetic flux density in the primary ring plate in response to relative rotation between the multipole magnet and the primary yoke, wherein the alignment direction of the primary yoke and the secondary yoke is a direction along which the primary yoke and the secondary yoke are arranged;

the secondary yoke is configured such that a maximum width of a widest portion of each of the plurality of secondary teeth, which is widest along each of the plurality of secondary teeth in the alignment direction, is set to be smaller than a width between the inner periphery and an outer periphery of the secondary ring plate at a portion of the secondary ring plate which is circumferentially centered between adjacent secondary teeth of the plurality of secondary teeth, to, when the central axis of the multipole magnet deviates from the central axis of the yoke member with the maximum amount of eccentricity while the yoke member is in use as part of the torque detection device, limit a flow of the magnetic flux flowing from the multipole magnet to the secondary ring plate through a corresponding one or more of the plurality of secondary teeth, thereby maintaining a maximum density of the magnetic flux generated in the secondary ring plate to a level that is smaller than a saturation magnetic flux density of the secondary ring plate, and generate a change in a magnetic flux density in the secondary ring plate in response to relative rotation between the multipole magnet and the secondary yoke;

the maximum width of each of the plurality of primary teeth is a width of a base of each of the plurality of primary teeth which is joined to the primary ring plate, wherein the base of each of the plurality of primary teeth is bent and radially extends in parallel with the primary ring plate; and the maximum width of each of the plurality of secondary teeth is a width of a base of each of the plurality of secondary teeth which is joined to the secondary ring plate, wherein the base of each of the plurality of secondary teeth is bent and radially extends in parallel with the secondary ring plate.

2. The yoke member according to claim 1, wherein:

at least one of the primary ring plate and the secondary ring plate has a ring plate side fixing portion that is formed as a cutout in the at least one of the primary ring plate and the secondary ring plate; and at a portion of the at least one of the primary ring plate and the secondary ring plate, at which the ring plate side fixing portion is formed, a minimum width between the inner periphery and the outer periphery is a width of a remaining portion of the at least one of the primary ring plate and the secondary ring plate, at which the ring plate side fixing portion is cut out to leave the remaining portion.

3. The yoke member according to claim 1, wherein:

at least one of the primary ring plate and the secondary ring plate has a ring plate side fixing portion that is formed as a cutout in the at least one of the primary ring plate and the secondary ring plate; and the at least one of the primary ring plate and the secondary ring plate, which has the ring plate side fixing portion, has a projection that is formed at a portion which intersects an imaginary straight line that extends through the ring plate side fixing portion in a radial direction in the at least one of the primary ring plate and the secondary ring plate.

4. A torque detection device configured to output a measurement signal that corresponds to a torsional torque generated at a torsion bar in response to relative rotation between a first shaft and a second shaft about a rotational axis while the torsion bar coaxially couples between the first shaft and the second shaft along the rotational axis, the torque detection device comprising:

a multipole magnet that is coaxial with the torsion bar and has a plurality of magnetic poles arranged in a circumferential direction about the rotational axis such that polarities of the plurality of magnetic poles are alternately changed in the circumferential direction, wherein the multipole magnet is configured to rotate about the rotational axis in response to the relative rotation;

the yoke member of claim 1, which surrounds the multipole magnet and is arranged such that the central axis of the yoke member coincides with the rotational axis; and a magnetic detection element that is configured to output the measurement signal, which corresponds to a magnetic flux generated between the primary yoke and the secondary yoke.

5. The torque detection device according to claim 4, wherein a magnetic flux guide member is placed at a part of a region between the primary ring plate and the secondary ring plate.

6. The torque detection device according to claim 4, wherein a magnetic flux guide member has a portion that is opposed to the primary ring plate and the secondary ring plate in a radial direction of the primary ring plate and the secondary ring plate.

7. A steering device for a vehicle, comprising:

the torque detection device of claim 5; and an electric motor that is configured to output a drive force for assisting operation of a steering unit, which is configured to be operated by an occupant of the vehicle, based on the measurement signal of the torque detection device.

8. The torque detection device according to claim 4, comprising a magnetic flux guide member that is configured to guide the magnetic flux, which is generated between the primary yoke and the secondary yoke, to the magnetic detection element.

9. The yoke member according to claim 1, wherein:

two circumferentially opposite ends of a connection of the base of each of the plurality of primary teeth, which is joined to the primary ring plate, are radially outwardly recessed into the primary ring plate; and two circumferentially opposite ends of a connection of the base of each of the plurality of secondary teeth, which is joined to the secondary ring plate, are radially outwardly recessed into the secondary ring plate.

10. The yoke member according to claim 1, wherein:

when the central axis of the multipole magnet deviates from the central axis of the yoke member with the maximum amount of eccentricity, the maximum density of the magnetic flux generated in the primary ring plate is kept equal to or smaller than 50% of the saturation magnetic flux density of the primary ring plate; and when the central axis of the multipole magnet deviates from the central axis of the yoke member with the maximum amount of eccentricity, the maximum density of the magnetic flux generated in the secondary ring plate is kept equal to or smaller than 50% of the saturation magnetic flux density of the secondary ring plate.

11. The yoke member according to claim 1, wherein:

when the central axis of the multipole magnet deviates from the central axis of the yoke member with the maximum amount of eccentricity, the multipole magnet is in contact with one of the plurality of primary teeth; and when the central axis of the multipole magnet deviates from the central axis of the yoke member with the maximum amount of eccentricity, the multipole magnet is in contact with one of the plurality of secondary teeth.

12. A yoke member for a torque detection device that includes a multipole magnet, the yoke member comprising:

a primary yoke and a secondary yoke which are opposed to each other and are configured to be disposed around the multipole magnet, wherein:

the primary yoke has:

a primary ring plate, which is shaped in a ring form; and a plurality of primary teeth, which are arranged at equal intervals along an inner periphery of the primary ring plate and project in a normal direction that is normal to a plane of the primary ring plate;

the secondary yoke has:

a secondary ring plate, which is shaped in a ring form; and a plurality of secondary teeth, which are arranged at equal intervals along an inner periphery of the secondary ring plate and project in a normal direction that is normal to a plane of the secondary ring plate;

the primary yoke and the secondary yoke are arranged such that the plurality of primary teeth and the plurality of secondary teeth are alternately arranged in a circumferential direction of the primary ring plate, and a predetermined gap is maintained between the primary yoke and the secondary yoke;

the primary yoke has at least one reducing portion that is configured to reduce a magnetic flux that flows from a corresponding one or more of the plurality of primary teeth to the primary ring plate, wherein the at least one reducing portion of the primary yoke is configured to, when a central axis of the multipole magnet deviates from a central axis of the yoke member with a maximum amount of eccentricity while the yoke member is in use as part of the torque detection device, limit a flow of a magnetic flux flowing from the multipole magnet to the primary ring plate through a corresponding one or more of the plurality of primary teeth, thereby maintaining a maximum density of the magnetic flux generated in the primary ring plate to a level that is smaller than a saturation magnetic flux density of the primary ring plate, and generate a change in a magnetic flux density in the primary ring plate in response to relative rotation between the multipole magnet and the primary yoke;

the secondary yoke has at least one reducing portion that is configured to reduce a magnetic flux that flows from a corresponding one or more of the plurality of secondary teeth to the secondary ring plate, wherein the at least one reducing portion of the secondary yoke is configured to, when the central axis of the multipole magnet deviates from the central axis of the yoke member with the maximum amount of eccentricity while the yoke member is in use as part of the torque detection device, limit a flow of the magnetic flux flowing from the multipole magnet to the secondary ring plate through a corresponding one or more of the plurality of secondary teeth, thereby maintaining a maximum density of the magnetic flux generated in the secondary ring plate to a level that is smaller than a saturation magnetic flux density of the secondary ring plate, and generate a change in a magnetic flux density in the secondary ring plate in response to relative rotation between the multipole magnet and the secondary yoke;

a base of each of the plurality of primary teeth, which is joined to the primary ring plate, is bent and radially extends in parallel with the primary ring plate; and a base of each of the plurality of secondary teeth, which is joined to the secondary ring plate, is bent and radially extends in parallel with the secondary ring plate.

13. The yoke member according to claim 12, wherein:

the at least one reducing portion of the primary yoke is formed by a portion of the corresponding one of the plurality of primary teeth, which extends perpendicular to the normal direction and has a maximum cross-sectional area that is smaller than a minimum cross-sectional area of a portion of the primary ring plate, which extends perpendicular to the circumferential direction; and the at least one reducing portion of the secondary yoke is formed by a portion of the corresponding one of the plurality of secondary teeth, which extends perpendicular to the normal direction and has a maximum cross-sectional area that is smaller than a minimum cross-sectional area of a portion of the secondary ring plate, which extends perpendicular to the circumferential direction.

14. The yoke member according to claim 13, wherein:

the maximum cross-sectional area of the corresponding one of the plurality of primary teeth exists at the base of the corresponding one of the plurality of primary teeth which is adjacent to the primary ring plate; and the maximum cross-sectional area of the corresponding one of the plurality of secondary teeth exists at the base of the corresponding one of the plurality of secondary teeth which is adjacent to the secondary ring plate.

15. The yoke member according to claim 13, wherein the maximum cross-sectional area of the corresponding one of the plurality of primary teeth and the maximum cross-sectional area of the corresponding one of the plurality of secondary teeth are set to be equal to or larger than 2.4 mm$^2$.

16. The yoke member according to claim 13, wherein:

a thickness of the primary ring plate is larger than a thickness of each of the plurality of primary teeth; and a thickness of the secondary ring plate is larger than a thickness of each of the plurality of secondary teeth.

17. The yoke member according to claim 12, wherein:

the at least one reducing portion of the primary yoke is formed by a constriction that is located at:

the corresponding one of the plurality of primary teeth; or a primary connecting portion which connects between the corresponding one of the plurality of primary teeth and the primary ring plate; and the at least one reducing portion of the secondary yoke is formed by a constriction that is located at:

the corresponding one of the plurality of secondary teeth; or a secondary connecting portion which connects between the corresponding one of the plurality of secondary teeth and the secondary ring plate.

18. The yoke member according to claim 17, wherein:

the constriction of the primary yoke is formed at the base of the corresponding one of the plurality of primary teeth which is adjacent to the primary ring plate; and the constriction of the secondary yoke is formed at the base of the corresponding one of the plurality of secondary teeth which is adjacent to the secondary ring plate.

19. A torque detection device configured to output a measurement signal that corresponds to a torsional torque generated at a torsion bar in response to relative rotation between a first shaft and a second shaft about a rotational axis while the torsion bar coaxially couples between the first shaft and the second shaft along the rotational axis, the torque detection device comprising:

a multipole magnet that is coaxial with the torsion bar and has a plurality of magnetic poles arranged in a circumferential direction about the rotational axis such that polarities of the plurality of magnetic poles are alternately changed in the circumferential direction, wherein the multipole magnet is configured to rotate about the rotational axis in response to the relative rotation;

the yoke member of claim 10, which surrounds the multipole magnet and is arranged such that the central axis of the yoke member coincides with the rotational axis; and a magnetic detection element that is configured to output the measurement signal, which corresponds to a magnetic flux generated between the primary yoke and the secondary yoke.

20. The torque detection device according to claim 19, wherein a magnetic flux guide member is placed at a part of a region between the primary ring plate and the secondary ring plate.

21. The torque detection device according to claim 19, wherein a magnetic flux guide member has a portion that is opposed to the primary ring plate and the secondary ring plate in a radial direction of the primary ring plate and the secondary ring plate.

22. A steering device for a vehicle, comprising:

the torque detection device of claim 17; and an electric motor that is configured to output a drive force for assisting operation of a steering unit, which is configured to be operated by an occupant of the vehicle, based on the measurement signal of the torque detection device.

23. The torque detection device according to claim 19, comprising a magnetic flux guide member that is configured to guide the magnetic flux, which is generated between the primary yoke and the secondary yoke, to the magnetic detection element.

24. The yoke member according to claim 12, wherein:

when the central axis of the multipole magnet deviates from the central axis of the yoke member with the maximum amount of eccentricity, the maximum density of the magnetic flux generated in the primary ring plate is kept equal to or smaller than 50% of the saturation magnetic flux density of the primary ring plate; and when the central axis of the multipole magnet deviates from the central axis of the yoke member with the maximum amount of eccentricity, the maximum density of the magnetic flux generated in the secondary ring plate is kept equal to or smaller than 50% of the saturation magnetic flux density of the secondary ring plate.

25. The yoke member according to claim 12, wherein:

when the central axis of the multipole magnet deviates from the central axis of the yoke member with the maximum amount of eccentricity, the multipole magnet is in contact with one of the plurality of primary teeth; and when the central axis of the multipole magnet deviates from the central axis of the yoke member with the maximum amount of eccentricity, the multipole magnet is in contact with one of the plurality of secondary teeth.

* * * * *